United States Patent [19]

Segarra et al.

[11] 4,430,699
[45] Feb. 7, 1984

[54] DISTRIBUTED DATA PROCESSING SYSTEM

[75] Inventors: Gerard Segarra, Jossigny; Francois J. Phulpin, Saint Mande, both of France

[73] Assignee: U.S. Philips Corporation, New York, N.Y.

[21] Appl. No.: 235,291

[22] Filed: Feb. 17, 1981

[30] Foreign Application Priority Data

Feb. 15, 1980 [FR] France ............................ 80 03464

[51] Int. Cl.³ .......................... G06F 13/00; G06F 9/06
[52] U.S. Cl. .................................. 364/200; 350/96.16
[58] Field of Search ... 364/200 MS File, 900 MS File; 350/96.15, 96.16

[56] References Cited

U.S. PATENT DOCUMENTS

| | | | |
|---|---|---|---|
| 4,161,650 | 6/1979 | Caovette et al. | 350/96.16 |
| 4,166,946 | 9/1979 | Chown et al. | 350/96.16 |
| 4,168,532 | 9/1979 | Dempsey et al. | 364/900 |
| 4,195,351 | 3/1980 | Barner et al. | 364/900 |
| 4,225,919 | 9/1980 | Kyu et al. | 364/200 |
| 4,234,968 | 11/1980 | Singh | 350/96.16 |
| 4,234,969 | 11/1980 | Singh | 350/96.16 |
| 4,249,266 | 2/1981 | Nakamori | 350/96.16 |

Primary Examiner—Mark E. Nusbaum
Assistant Examiner—Gary V. Harkcom
Attorney, Agent, or Firm—James J. Cannon, Jr.

[57] ABSTRACT

A distributed data processing system having several local systems (LS) between which communication is provided via clearly defined functional layers. A functional coordination layer managed by systems intercommunication processors (SIP) is responsible for the functions of coordination, communication, control, initialization and simulation relative to the LSs. A functional communication layer managed by communication modules (CM) is responsible for the communication protocols between the LSs. A functional transport layer including transmission modules (TM), a looped optical bus and a looping unit (LIG) element. A description of each LS is contained in its SIP in the form of descriptive tables facilitating the use of the resources of the global system by any LS via parameter translations, local to global to local, each communication between LSs being performed in the form of a transaction having separate interrogation, auto-selection, presentation, processing and result return phases.

11 Claims, 31 Drawing Figures

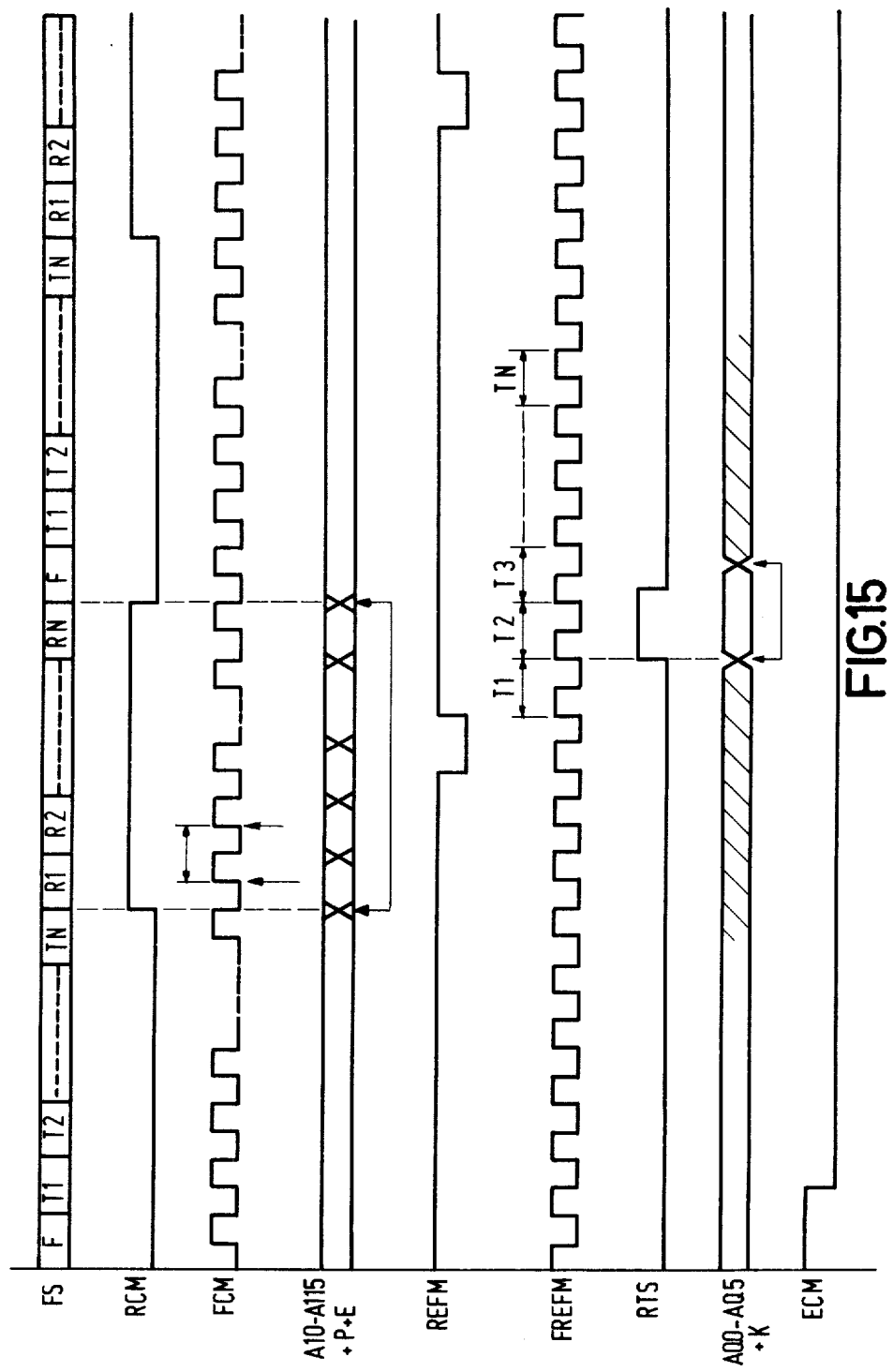

DISTRIBUTED DATA PROCESSING SYSTEM

BACKGROUND OF THE INVENTION

1. Field of the Invention

This invention relates to a distributed data processing system comprising several local systems (LS) 10, each of sid LS (10) comprising at least one processing unit (36) with the associated stores, peripherals (30 to 32) and processes and a local monitor (37 to 41), said LSs (10) communicating via a general communications network.

2. Description of the Prior Art

Technological progress in the field of integrated circuits (LSI) and their low cost have resulted in an evolution in the architecture of data processing systems towards distributed systems. There are now processors categories such as control processing units CPU) reserved exclusively for the users, processors oriented towards system management (resource allocation, data base management, communications, etc.) and service processors.

Moreover, the local interconnection of distributed data processing systems situated at an organization's premises having as objectives communication and resource sharing, has resulted in the creation of procedures and protocols to allow the initialization of distributed systems, communications between applications and the optimum use of resource sharing between them.

All the references listed in the appendix are of a general nature. In reference (1), the distributed control of the overall system resides in each of the LSs, which are processors with a main store in this instance. References (2) and (3) describe a distributed communications network for the transmission of data in packets in which the user programs and resources are shared. In this system, however, all the units are placed in a "bus" hierarchy. References (4) to (7) describe either distributed processing (reference 4) or distributed control (references 5 and 6), or the sharing of all the components of a system. In the present invention, the various functions of a distributed system are separated from the LS and are located in their respective functional layers; e.g. the coordination functions (sharing of resources between the LS, etc.) are located in the functional coordination layer and managed by systems intercommunications processors (SIP), the communications procedures between the LS are located in the functional communications layer and managed by the communication modules CM, and the elements required for physical transmission on an optical bus between the LS are located in the functional transport layer and are managed by the TM (Transmission Modules) and the LIG (Looping Unit).

SUMMARY OF THE INVENTION

The present invention has the following characteristics:

the distributed system is of the medium-scale type (MSDS) capable of interconnecting several local systems on the general communications network and of simultaneously executing a plurality of user programs;

the general communications network used for communication between the local systems is an optical bus;

in the preferred embodiment the transmission flow rate on the optical bus gives a bi-directional transfer speed of about 300 kwords/second per local system;

the physical characteristics of the optical bus limit the distribution of the local systems to lengths of a few kilometers within an MSDS.

The coordination layer managed by the SIP and the communications layer managed by the CM are described in pending U.S. patent applications Ser. Nos. 202,809, filed Oct. 31, 1980, and 216,105, filed Dec. 15, 1980, respectively, but their overall use in this invention is described from the viewpoint of the structure, functions and mechanisms of the physical communication.

This invention, therefore, is characterized in that said distributed system also comprises an extension monitor module (EM 42) associated with each of said LS (10), communications between LSs (10) being provided by:

(a) a functional coordination layer (12) managed by systems intercommunications processors (SIP 11) comprising specialized hardware and software providing the functions of coordination, communication, control initialization and simulation concerning the LS (10), communications between said LS (10) and said SIP (11) taking place via the LS/SIP interface via said EM (42) and LS/SIP intercommunication mechanisms controlled by said SIP (11);

(b) a functional communications layer (14) managed by communication modules (CM 13) comprising specialized hardware and software providing the management of the communication protocols between said LSs (10), said communication protocols comprising means for establishing addressed and broadcast logical links, means for controlling the information flow rate, means for presenting the same global order of events at each LS (10), and procedures for error detection and recovery, the communications between said SIP (11) and said CM (13) taking place via the SIP/CM interface by means of SIP/CM intercommunication mechanisms controlled by said SIP (11) and said CM (13), the communications between said CM (13) and the transmission modules (TM 15) taking place through the CM/TM interface via CM/TM intercommunications mechanisms controlled by said CM (13) and said TM (15);

(c) a functional transport layer (18) also comprising the TM (15), a looped optical bus (16) and a Looping Unit (LIG 17), said TM (15) comprising specialized hardware and software for controlling parity errors and for electro-optical and opto-electronic conversion, and also for maintaining synchronization between said CM (13) and said optical bus (16) respectively, said LIG (17) comprising specialized hardware and software for coding and decoding each transmission frame on said optical bus (16), means for managing the initialization procedure for synchronizing transmission on said optical bus (16) and means to ensure the correct transmission and reception of the data in the channels allocated to the LS (10).

One of the main aims of this invention is a system capable of providing the improved solutions for a variety of user applications. The separation according to this invention of a distributed system into functional layers with clearly defined mutual interfaces makes it possible to separate the functions and provides a clearly structured system.

Thus the functions of coordination, communication, initialization and simulation incorporated into the coordination layer managed by the SIP make possible the exchange of information, programs and services in real time, the optimum use of the resources of the system as a whole and thus a reduction in costs, the increased availability of the system's resources with graceful degradation capabilities in case of sub system failure, the provision of a system compatible with the applications to be processed, and at the same time capable of upward growth.

The communication protocols managed by the CM located in the functional communications layer are specified in order to respond flexibly and efficiently to the defined characteristics of the MSDS, i.e. to a set of applications requiring a rapid response time and high information flow rates on the overall system. The definition of two logical link modes, broadcast and addressed, provides great flexibility. By way of example, as the broadcast mode has a higher priority than the addressed mode, it is particularly efficient in updating multiple files in a data base application or in quickly localizing the resources requested by an LS in a real time application. The addressed mode is efficient if an LS wishes to communicate with another. The broadcast mode may, for instance, be used to locate certain resources requested and the addressed mode subsequently used to communicate efficiently with these located resources.

Another purpose of the communications protocols is to allow a source LS to call all the destinations in the broadcast mode without having to know the number of destinations connected to the overall system, providing a very efficient method of communication which tolerates the failure of a unit.

Yet another purpose of the communication protocols is to present the same order of global events to all in the broadcast mode so as to give each LS a coherent view of the overall status of the distributed system since, in such a system, each LS has only a fragmentary view of the state of the overall system. In order, therefore, to maintain a degree of coherence in the overall system, the order to these events must be the same at each LS. This allows a desynchronized destination to become resynchronized itself by monitoring the behavior of the synchronised destinations.

The purpose of the physical transport layer managed by the TM is to allow a high transmission speed (performed by the optical bus) and to achieve greater reliability through the optical bus, which is insensitive to electromagnetic phenomena, and through the error control realized by parity control and the coding of every transmission on the optical bus.

Another purpose is to ensure that every service request made to the monitor of an LS is systematically communicated via the extension monitor to the coordination layer (interrogation phase) to locate and select the best resources to satisfy the request.

In this invention, the interrogation and best-resource selection phase is followed by the presentation, processing and return phases for the result. That is, the objective is to communicate the request to the selected LS, to process the incoming request in an isolated LS by the local monitor and to return the result to the monitor of the originating LS.

A further aim is to maintain a description of the resources solely at local level. These resource description tables to be supplied to the coordination layer relate only to the local resources of the LS. Thus there is no need to update global tables (otherwise necessary in a distributed system with central control), and this enhances efficiency.

These and other advantages of this invention will be clearly demonstrated in the following description of a preferred embodiment. The description relates to the P 800 series of mini and micro-computers manufactured by Philips Data Systems. Only the part of the architecture of the P 800 concerning this invention (e.g. interface and input/output instructions) is described. The detailed descriptions of the P 800 architecture may be found in the cited references.

BRIEF DESCRIPTION OF THE DRAWINGS

In the drawings:
FIG. 15 is a diagram of the synchronization of the interface between the CM and the TM.

The Appendix contains:
(1) A description of the physical interface between the SIP and a P 800 local system.
(2) A description of the physical interface between the SIP and the CM.

(3) A description of the physical interface between the CM and the TM.

(4) A list of prior art references concerning this invention.

The architecture of the P 800 mini and microcomputers is described in the following references published by Philips Data Systems:

| - P 856M/P 857M | CPU Service Manual | 5111-991-2695X |
| - P 856M/P 857M | System Handbook | 5122-991-26931 |
| - P 851M | Vol. I CPU & Memories Technical Manual | 5122-991-28073. |

DESCRIPTION OF THE PREFERRED EMBODIMENTS

Figure 1:
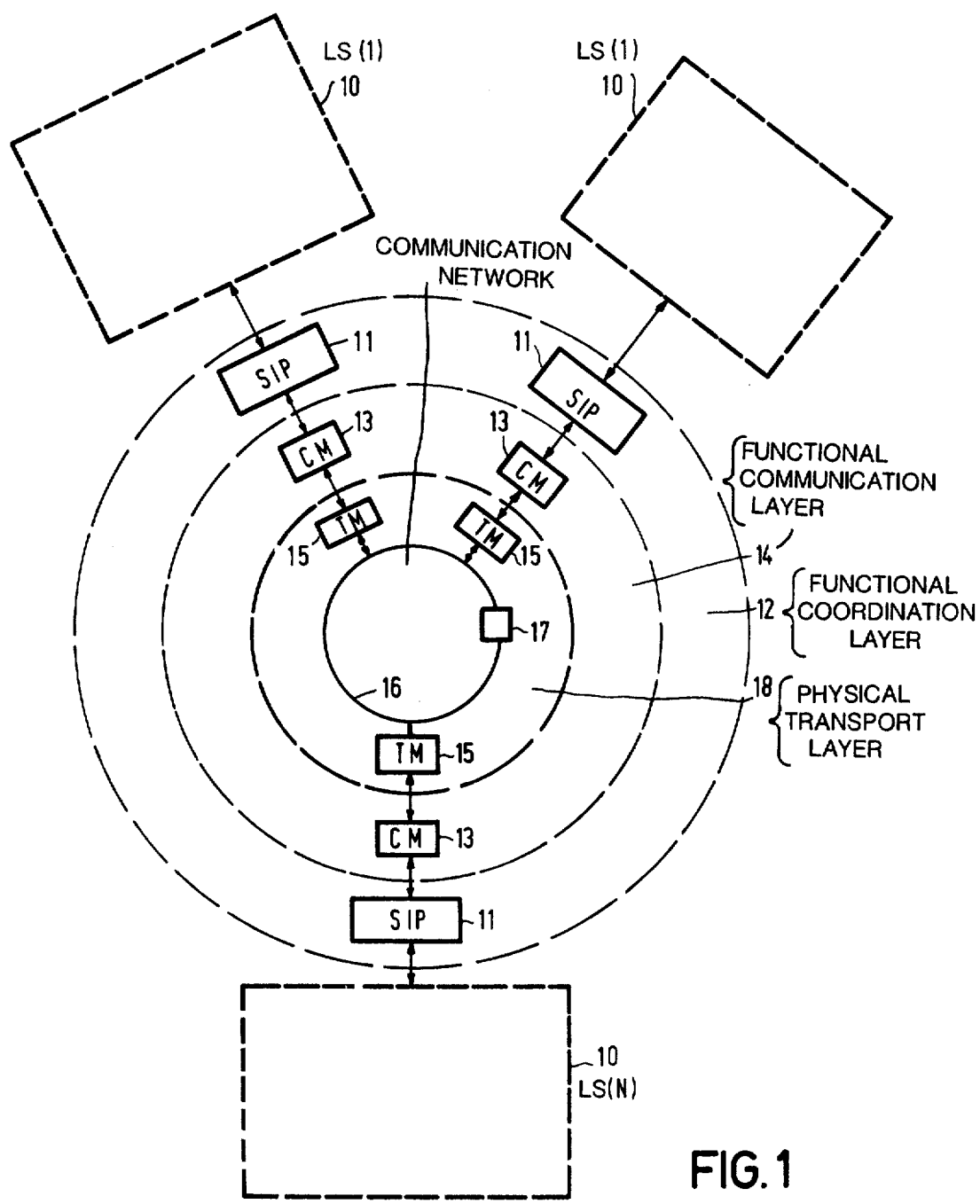
FIG. 1 is a synoptic diagram of a distributed data processing system showing the main sub-systems and functional layers.

FIG. 1 is a synoptic diagram of a distributed data processing system of the MSDS type already described. in FIG. 1, 10 represents the various local systems (LS1 ... LSI ... LSN). The SIP corresponding to each LS are represented by 11 and located in the functional coordination layer represented by 12. The communication modules (CM) represented by 13, for controlling the communication protocols between the various LS are located in the functional communication layer represented by 14.

CMs 13 intercommunicate via the communications network which uses an optical bus 16. Physical transport layer 18 consists of optical bus 16 arranged in a loop, transmission modules (TM) 15 realizing the interface between the optical bus and CM 13, and a Looping Unit (LIG) 17.

Figure 2:
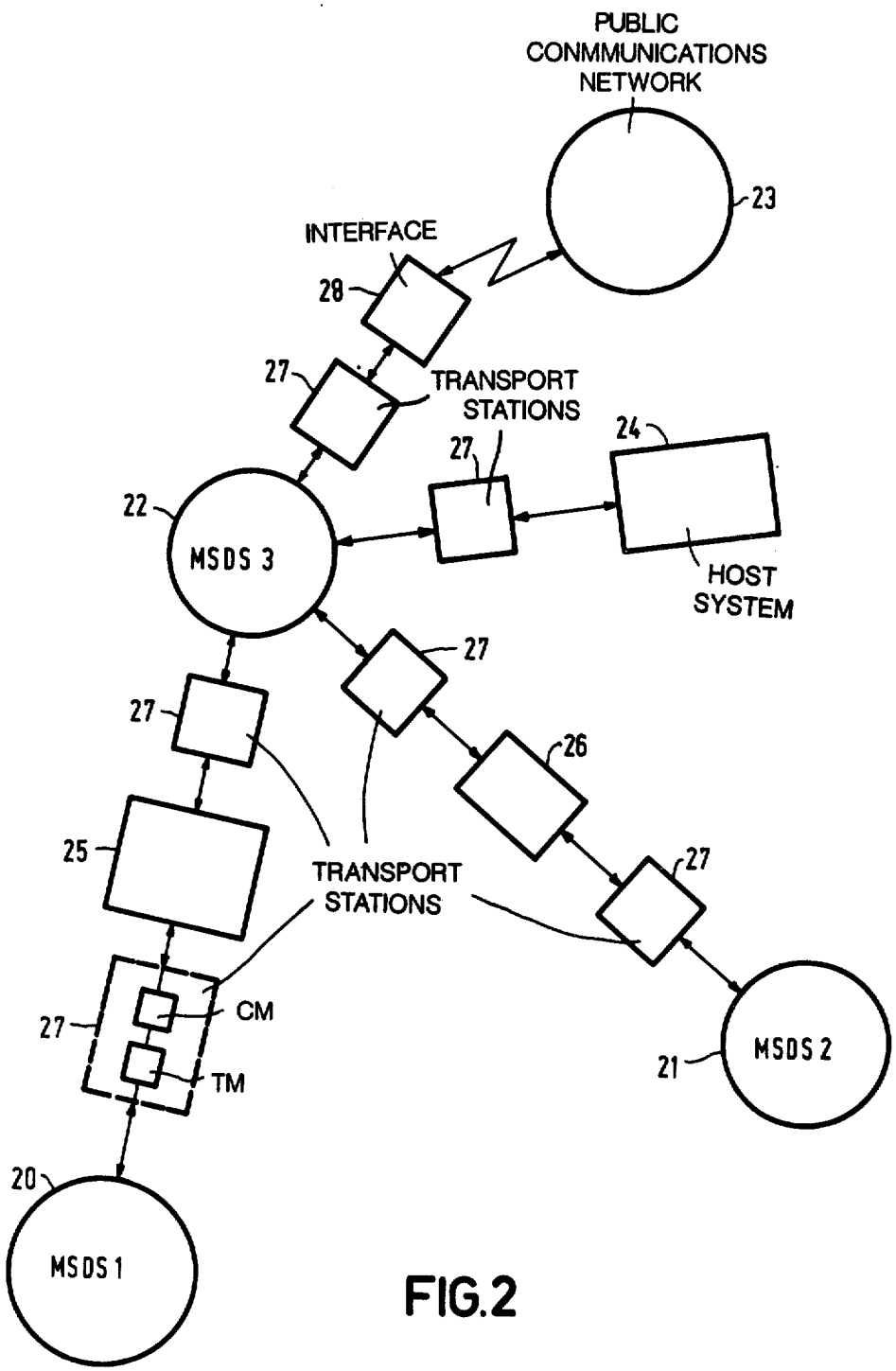
FIG. 2 shows an example of the possible type of physical interconnections, utilized by this invention.

Several MSDA-type systems may be interconnected among themselves or linked to a public communications network; an example is shown on FIG. 2. MSDSs 1 and 2 represented by 20 and 21 have a relatively low transmission rate and are more specifically intended to interconnect the microcomputers without resources (man-machine interfaces, process control, etc.). MSDS 3, which has a higher rate, represented by 22, facilitates the interconnection of systems with the organization's sharable resources. Any system of MSDS 1 and 2 may use these resources via local front end systems 25 and 26 and their associated transport stations TS 27. Each TS 27 consists of a CM 13 and a TM 15. The sharable resources may be data bases distributed over several minicomputers, while the local front ends provide access to public or private communications networks (Transpac, satellite communications) or specialized processing units.

MSDSs 3, (22) may communicate with a "host" system 24 which may be a central system with resources which are not available at MSDS level, via an associated TS 27. MSDS 3 and public communications network 23 may communicate via a TS 27 and a processing interface 28, which may consist of a set of minicomputers, for example, translating the protocols used in MSDS 3 to those used by communications network 23, e.g. protocol X 25, and vice versa for the information coming from network 23. Thus a user in any MSDS may communicate either with the users in the same MSDS or in the other MSDS, or through the public communications network. In addition, the users have access to the resources of host system 24.

The components mentioned in connection with FIG. 1 and the mechanisms for communication between them will now be described with reference to the appropriate figures.

Figure 3:
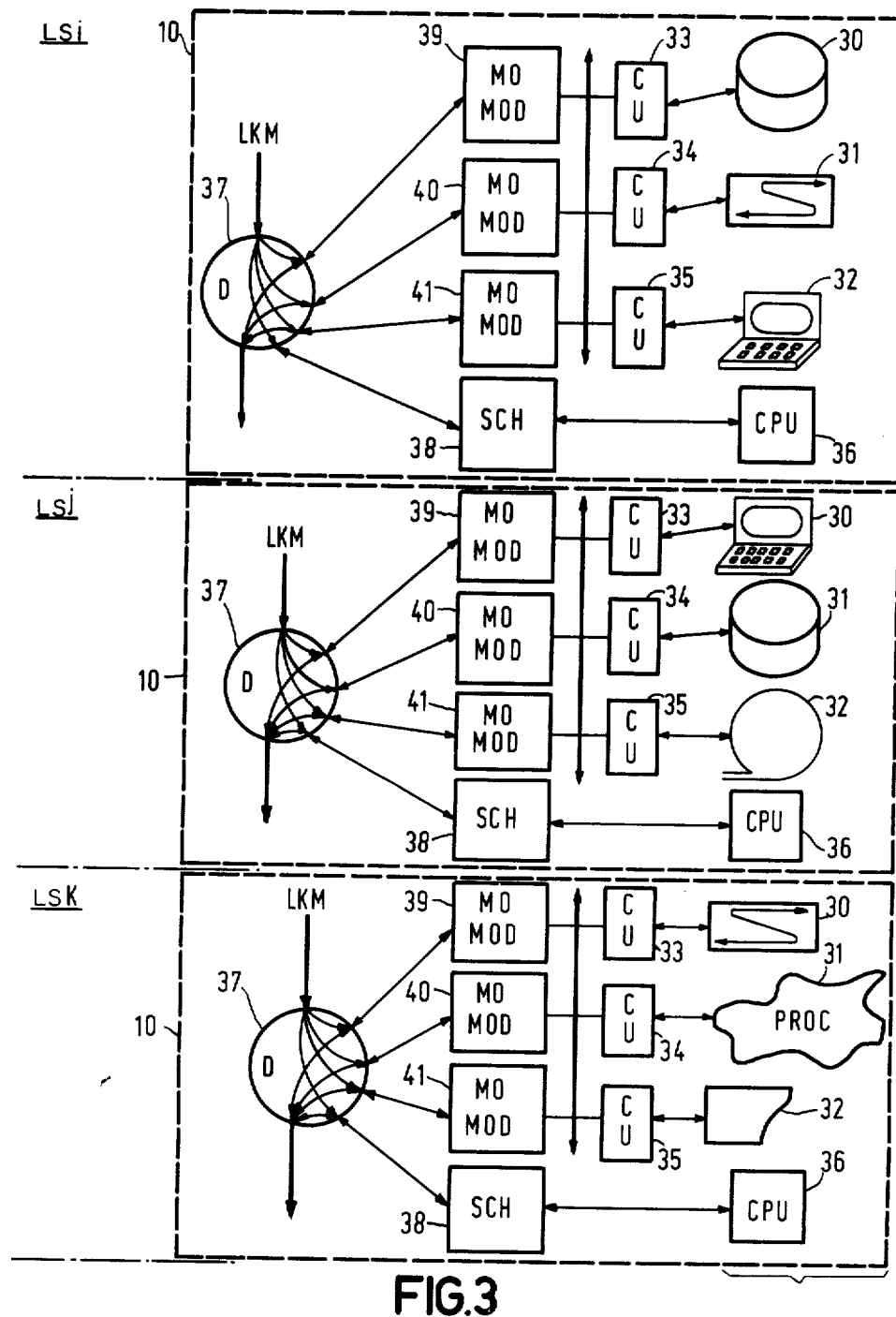
FIG. 3 is a synoptic diagram of several isolated LS.

FIG. 3 is a synoptic diagram of several isolated LSs 10 located at several sites. Each LS may include a plurality of peripherals. In FIG. 3, 30 to 32 represent the peripherals such as discs, magnetic tapes, processes, etc., controlled by control units 33 to 35. The P 800 type central processing unit (CPU is represented by 36, and includes the main memory of the LS.

When a user or a process wishes to use a local resource (e.g. a magnetic disc), a service request is sent to the monitor via an LKM (Link to monitor) instruction. This instruction causes a high-level interrupt which activates "dispatcher" 37. The request is analyzed by dispatcher 37 of the monitor and communicated to one or more of the other modules of the monitor (38 to 41) responsible for processing the request. Once the request has been processed, an event bit (E) is placed in the event control block (ECB) of the user, which is informed of the end of the processing of its request.

Such a system requires the presence of all the resources needed for job processing on the local site; often the resources are poorly used and are inactive for most of the time. This problem is aggravated when for reasons of reliability some or all of the LSs' resources must be duplicated.

Figure 4:
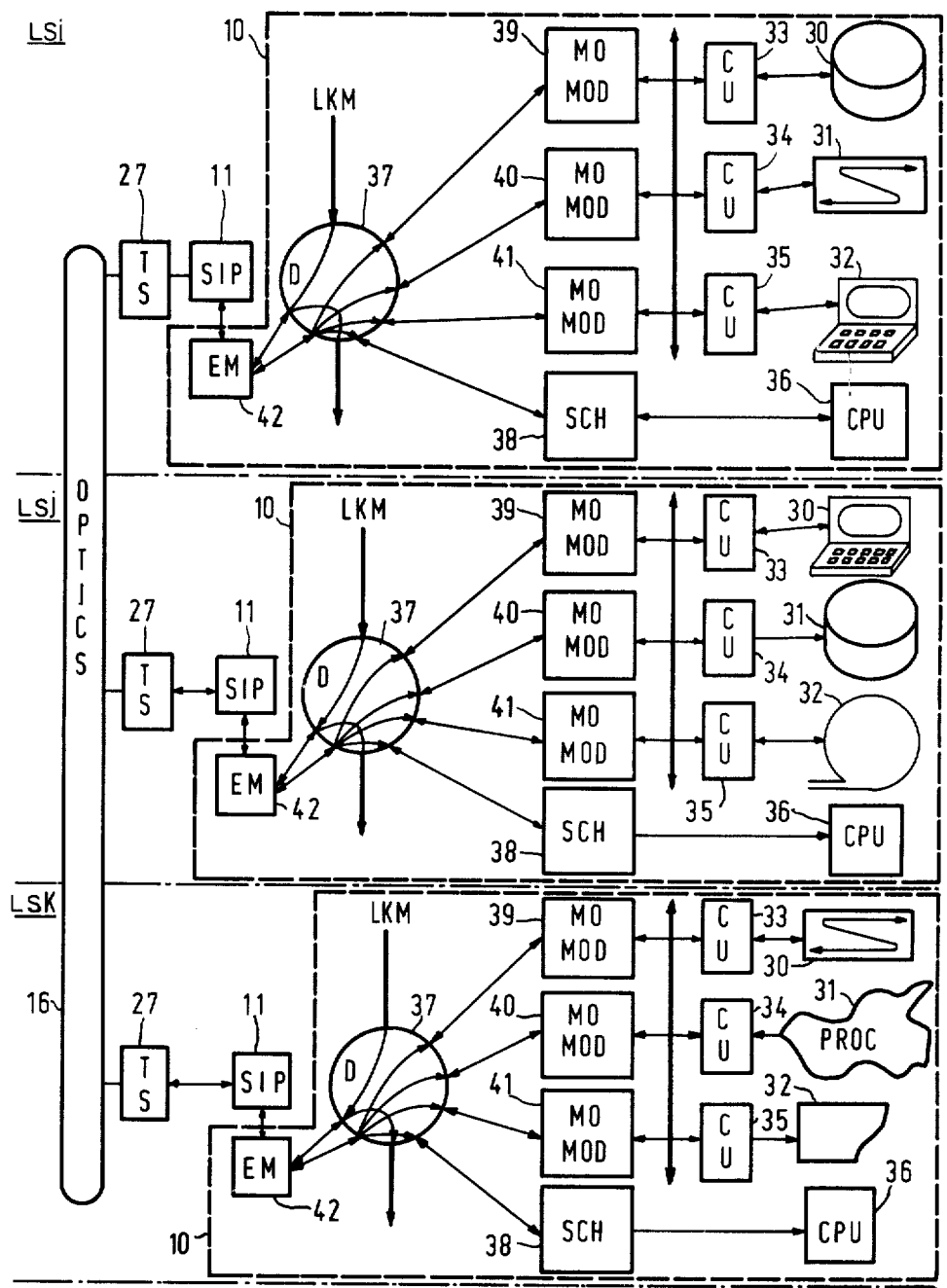
FIG. 4 is a synoptic diagram of several LS as used in this invention.

It is necessary for most applications to optimize resource sharing in order to improve the availability of the overall system, to increase extensibility and to reduce costs. FIG. 4 is a synoptic diagram showing how the resource sharing problem is solved by this invention. Here, the LSs 10 located on sites i, j and k are the same as those described for FIG. 3, except that an extension monitor module (EM) 42 is added to each LS 10.

When the local monitor receives a service request from a process or a user, dispatcher 37 activates the extension monitor (EM) 42, which reformats the request and sends it to SIP 11 as a command block.

SIP 11 transmits this request over optical bus 16 via TS 27 to all the connected LSs 10. SIPs 11 distributed over the various sites take the request into account and determine the location(s) of the unit(s) required for processing. The request is then presented to the selected monitor(s) and processed as if it originated from the LS. At the end of processing, the result is sent to the source SIP 11 which forwards it to the process or user originating the request.

The communication mechanisms between the SIP and the local system (LS) will now be described. The SIP interprets the input/output instructions of a P 800 system.

COMMUNICATION MECHANISMS AND INSTRUCTIONS

Commands (CPU→SIP)

The LS (CPU 36 uses an input/output instruction (start CIO) to inform the SIP (by way of synchronization) that a command is being sent to it. This command may be directly transferred on the P 800 bus if it is no longer than a 16-bit word (contents of the register specified by the CIO) on the execution of the instruction. (The physical inter-face between the SIP and the P 800 bus is described in the Appendix). Otherwise, the address of a command block located in the main memory will then be specified (content of the register indicated by the CIO instruction). This control block contains all the directives, parameters and data needed to execute the command.

Incoming request (SIP→CPU)

A command issued by an LS may give rise to one or more incoming requests communicated to the other local system(s) concerned.

An incoming request is communicated by the generation of an interrupt to CPU 36 of the LS concerned, which then executes an SST I/O instruction to find out the reason for the interrupt. After the SST instruction has been executed, the register specified by the latter instruction contains the address of an incoming request block located in the main memory and containing all the information concerning this request. The SIP uses a memory block previously allocated to it by the LS to receive the incoming requests.

Issue of a result (CPU→SIP)

After an incoming request has been processed, the LS sends the relevant result to its associated SIP. This result is comunicated by means of an I/O instruction (start CIO) executed by the CPU. The register specified by the instruction then contains the address of a result block previously buffered into the main memory.

Communication of a result (SIP→CPU)

A result concerning the execution of a command in a local system different from the originating local system will be communicated to the originating LS by means of an interrupt sent to the CPU which will then execute an SST I/O instruction. The register specified by the SST I/O instruction contains the address of a block in the main memory previously loaded with the result in question after the SST has been executed. The block used will have been allocated when the command was issued by the LS.

FORMAT OF THE RELEVANT 16-BIT INSTRUCTIONS

I/O instruction: start CIO

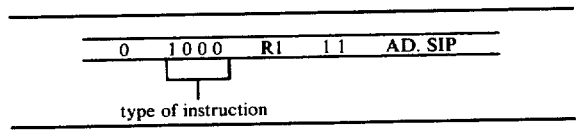

| 0 | 1 0 0 0 | R1 | 1 1 | AD. SIP | type of instruction

Bit 1 has always value zero. Bits 2-5 specify the instruction type Bits 6-8 (R1) specify a register; the content thereof either is directly a command or, alternatively, the address in the main store of a command or result block. During the execution of the instruction the content of register R1 is fowarded to the data bus. The two condition register bits (CR) are defined as follows
00 instruction accepted (LBR clear)
01 instruction refused (LBF full) 11 address not recognized LBR is an intermediate or mail-box register used for the transfer of commands between the processing module (PM) of the SIP and the CPU. The final six bits are reserved for the SIP address: AD-SIP. The following commanes are then contained in register R1:

Direct commands: CIO IPL

| (R1) | 0 - - - - - - - - - - - - - - - - - 0 | 1 |

This command permits an LS with initialization capabilities to initiate the remote loading and the remote starting of the requesting LS (pilot system).

CIO buffer allocation to the SIP

| (R1) | Address of allocated buffer ≠ 0 | 0 |

This command permits the allocation of a buffer to the SIP, thus authorizing the communication of an incoming request to the LS.

CIO mode

| (R1) | 0 - - - - - - - - - - - - - - - - - 0 | 0 |

This command causes the SIP to switch from an initialization to an operation mode, inhibiting certain external actions which might interfere with the local system (e.g. simulation of orders sent to the control panel).

Indirect commands

| (R1) | Address of command or result block ≠ 0 | 1 |

This command informs the SIP of the address of a block in the main memory containing information on a command or a result.

SST (READ STATUS)

| 0 | 1 0 0 1 | R1 | 1 1 | AD. SIP |

During the execution of the instruction, the contents of the data bus are loaded into the register specified by field R1. The condition register (CR) is defined as follows:

| 00 | instruction accepted |
| 01 | instruction refused |
| 11 | address not recognized. |

The contents of the register specified by R1 are then either directly an incoming request, or the address in the main memory of an incoming request or result block.

Direct SST

SST ACK

| (R1) | 0 - - - - - - - - - - - - - - - 0 | 0 |

Such a reply signifies that the last indirect command has been stored by the SIP and thus that the buffer used to communicate it is again available to the system.

SST clearing of memory in SIP

| (R1) | 0 - - - - - - - - - - - - - - - - - 0 | 1 |
|---|---|---|

This reply means that after an overflow in the SIP memory capacity, space is once more available for receiving commands or results.

SST command unknown

| (R1) | Address of command block unknown ≠ 0 | 0 |
|---|---|---|

Such a reply means that the command sent by the LS is unknown to the SIP and therefore cannot be interpreted by it.

Indirect SST

| (R1) | Address of incoming request or result block ≠ 0 | 1 |
|---|---|---|

Here, the register specified by R1 contains the address in the main memory of an incoming request or result block.

The SIP has a direct access mechanism to the main memory of the LS allowing it to transfer information directly from its I/O (input/output) buffers into the main memory and from the main memory into its I/O buffers. This mechanism will be described later.

DESCRIPTION OF THE SYSTEM INTERCOMMUNICATION PROCESSOR

Figure 5:
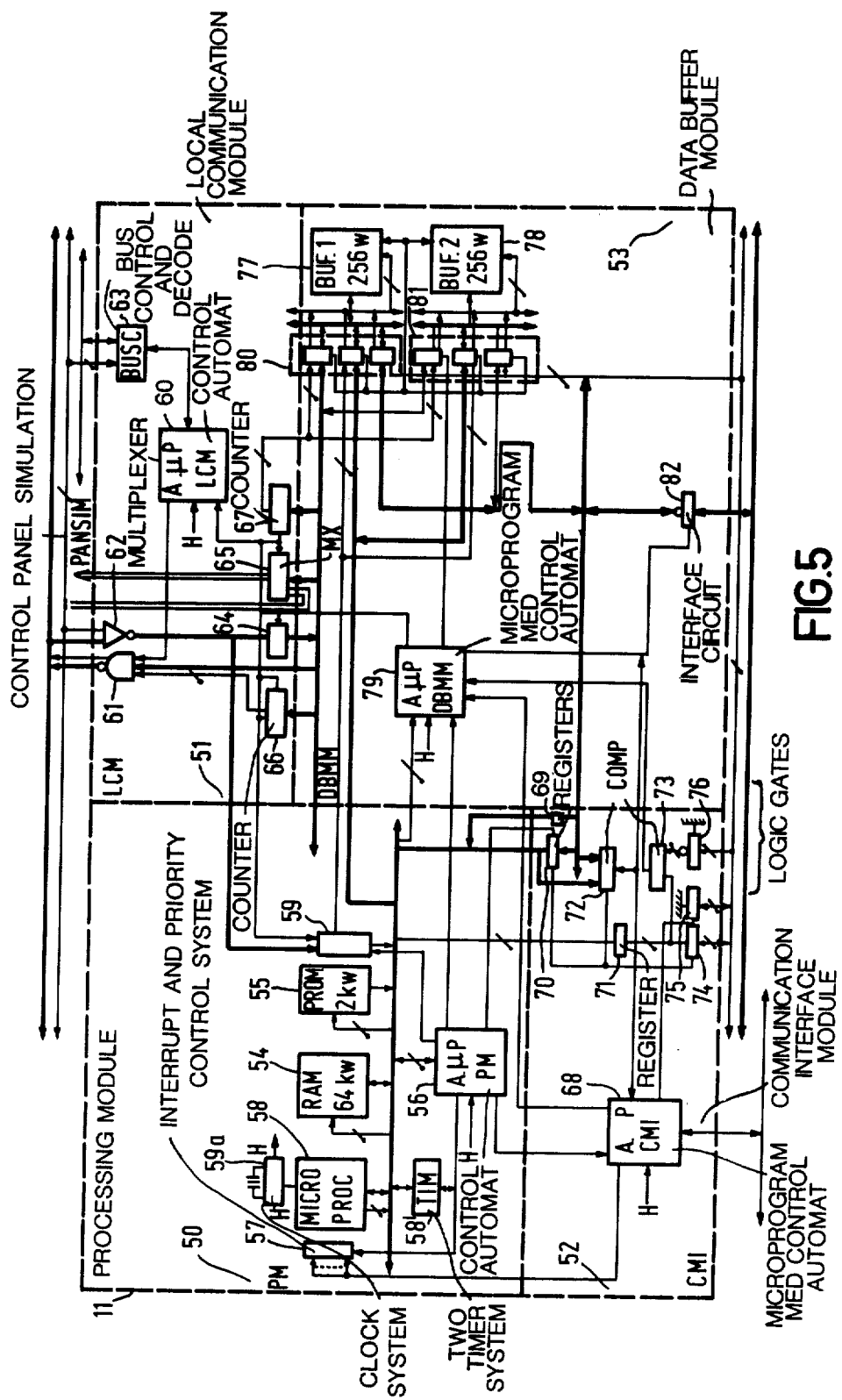
FIG. 5 is a block diagram of the SIP showing the main components and their connections.

FIG. 5 is a block diagram of SIP 11 showing the main components with their connections. The SIP may be divided into four modules which execute its respective processing and communication functions. The four modules are the processing module (PM) 50, the local communication module (LCM) 51, the communication interface module (CMI) 52 and the module controlling the input/output buffers or data buffer management module (DBMM) 53. The PM, LCM and CMI operate in parallel, whereas the DBMM is used for communications between them. The main interconnections between the four modules of the SIP are shown, i.e. the address, data and control lines. The physical interfaces of the SIP with a local system 10 based upon a central processing unit of the Philips P 800 series and the SIP via CM 13 are described in the Appendix. The use of the principal interface and control signals will be described in greater detail hereinafter.

The interconnections between the four modules of the SIP (the internal bus) consist of the same address lines (16 lines) and data lines (16 lines) as for the external interfaces. Address lines are designated by a crossing sign therethrough.

PM 50 consists of a microcomputer mainly comprising a microprocessor 58 INTEL 8086, 64 kwords of read-write memory (RAM) 54, and 2 kwords of reprogrammable read-only memory (PROM) 55. A PM control automat CA is shown as 56. This control automat (CA) 56 consists of wired logic connected to an FPLA (Field Programmable Logic Array). The contents of the FPLA define the sequencing performed by AC 26 depending on the various possible states. An interrupt and priority control system is shown as 57 and a system of two timers by 58'. A clock system 59a provides the clock signals used in SIP 11. A mail-box register 59 ensures communications between PM 50 and LCM 51. PM 50 is responsible for the coordination, control and initialization functions. RAM 54 contains the coordination executive (CCE) and the tables describing the objects and resources of the LS which will be described later. PROM 55 contains the initialization. remote loading and remote starting processes of the system. The programs in memories 54 and 55 are executed by microprocessor 58.

LCM 51 provides the communication functions with a P 800 LS 10, i.e. with CPU 36 via input/output instructions and an interrupt mechanism and with the main memory of an LS by direct memory access (DMA). In addition, LCM 51 simulates orders from the control panel (PAN.SIM. in FIG. 5). LCM 51 consists of a microprogrammed control automat 60, and interface and control circuits symbolically represented by 61 to 67. They comprise interface circuits 61 and 62 to ensure compatibility (logic level, power, etc.) between the LCM and an LS. The circuits which control the bus and decoding the instructions are indicated at 63. Counter 66 defines the direct-access address of the main memory (DMA) and counter 67 defines that of the DBMN buffer. Logic gates 64 control transfer for the address received from the LS and multiplexer 65 selects the input during control panel simulation.

CMI 52 controls the interface with CM 13 which may be either a processor or a memory interface, depending on the transfers initialized (the interface is described in the Appendix). The CMI consists of a microprogrammed control automat 68 and circuits symbolically represented by 69 to 76. Logic gates 74 to 76 are interface circuits. Registers 69 and 70 define the command and result block addresses transferred between CMI 52 and CM 13, and register 71 is used as a mail-box for the address of CM 13. Comparator 72 compares the address of the buffer allocated to the CM at the end of the execution of a command with the address sent by the CM, so that the PM may be informed of the buffer to be cleared. Comparator 73 compares the address of the SIP buffer with that sent by the CM.

DBMM 53 consists of two triple-access I/O buffers represented by 77 and 78 and a bidirectional allocation mechanism between:

the PM and the P 800 LS, via the LCM;
the PM and the CM, via the CMI;
the P 800 LS and the CM, via the LCM and CMI.

The buffer allocation mechanism is located in the microprogrammed control automat of DBMM 79 which, in turn is initiated by the PM. Multiplexer systems 80 and 81 provide appropriate access under the control of CA 79, while the interface circuits with the CM are symbolically represented by 82.

The internal communication mechanism of the SIP and the DBMM's I/O buffers will now be described. The situation of the SIP between an LS and the communications network means that the SIP has to control a great deal of information passing through it. This information follows different paths in relation to its nature and origin. A distinction must be made between:

the order to the SIP issue by the LS and received by the PM of the SIP which performs a pre-processing operation thereon;

the outgoing requests issued by the PM to the communications network;

the incoming requests from the communications network sent to the PM for analysis. After analysis, these requests may be communicated by the PM to the LS;

the data issued by an LS to the cmmunications network;

the data from the communications network sent to the LS.

The communications network, which allows for a continuous bi-directional traffic of 300 kwords per second per LS, implies that there are rapid transfers to which a buffer has been allocated may use it exclusively as long as it has not been returned to the PM. In fact, the use of an I/O buffer by one of the three components consists in providing an exchange of information either with the LS or with the communications network via the CM.

Memories and peripherals are selected by decoding address bits and some control bits in the PM. Table I below specified these decoding and selection procedures.

TABLE I

| M10 | A19M | A17M | A15M | A14M | A13M | A12M | A11M | A10M | A9M | Selection |
|---|---|---|---|---|---|---|---|---|---|---|
| 0 | X | X | 0 | 0 | 0 | 0 | 0 | 0 | 0 | Selection of CM (1) |
| 0 | X | X | 0 | 0 | 0 | 0 | 1 | 0 | 0 | Selection of LCM |
| 0 | X | X | 0 | 0 | 1 | 0 | 0 | 0 | 0 | Allocation buffer No. 1 to PM |
| 0 | X | X | 0 | 0 | 1 | 0 | 0 | 0 | 1 | Allocation buffer No. 2 to PM |
| 0 | X | X | 0 | 0 | 1 | 0 | 0 | 1 | 1 | Allocation buffer No. 1 to CM |
| 0 | X | X | 0 | 0 | 1 | 0 | 0 | 1 | 1 | Allocation buffer No. 2 to CM |
| 0 | X | X | 0 | 0 | 1 | 0 | 1 | 0 | 0 | Allocation buffer No. 1 to LCM |
| 0 | X | X | 0 | 0 | 1 | 0 | 1 | 0 | 1 | Allocation buffer No. 2 to LCM |
| 0 | X | X | 0 | 0 | 1 | 1 | 1 | 1 | 0 | Real time clock (2) |
| 0 | X | X | 0 | 1 | 0 | 0 | 0 | 0 | 0 | Initialization timer (3) |
| 0 | X | X | 1 | 0 | 0 | 0 | 0 | 0 | 0 | Initialization system II (4) |
| 0 | 0 | 0 | 0 | High address weighting | | | | | | Selection RAM 64 K (5) |
| 1 | 0 | 1 | 0 | 0 | 0 | 0 | 0 | 0 | 0 | Selection buffer No. 1 (5) |
| 1 | 0 | 1 | 0 | 0 | 0 | 0 | 0 | 0 | 1 | Selection buffer No. 2 (5) |
| 1 | 1 | 1 | 1 | 1 | 1 | 1 | High weighting | | | Selection PROM (5) | through the SIP. Apart from the PM processing time, it is important that the transit time for information through the SIP to be as short as possible. To achieve the objective, the invention makes use of the two following methods;

the use of modules (LCM, CMI) controlled by the PM and working in parallel with it;

the use of a communication mechanism facilitating exchanges between the three components in question (LS, PM and cmmunications network via the CM).

Figure 6:
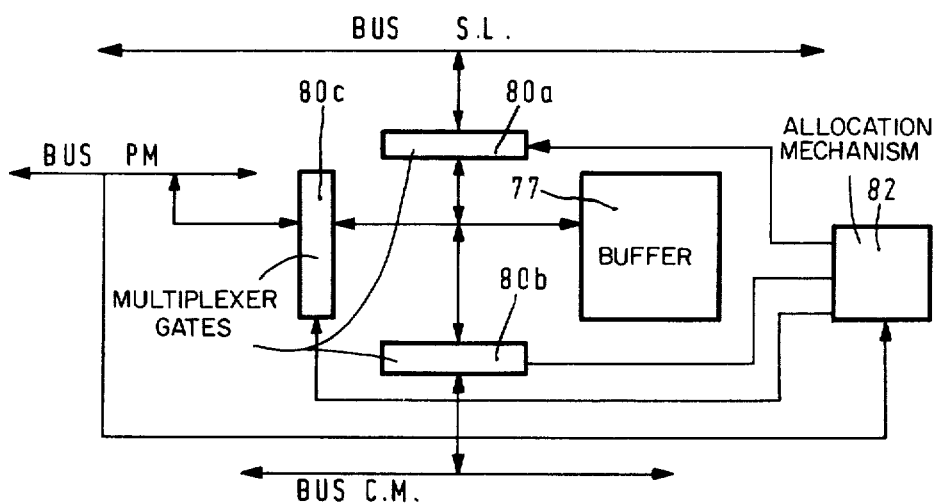
FIG. 6 shows the principle of the mechanism for allocating an input/output buffer.

The communications mechanism comprises the two I/O buffers 77 and 78 (which are RAM with 256 words each), with triple access, and an allocation mechanism associated with each of them. FIG. 6 shows the prinicple of this mechanism for a buffer (77, for example). In FIG. 6, buffer 77 may be independently allocated to one of the three components concerned (PM, LS, ICM) via the PM, LS or CM bus and multiplexers 80a, 80b and 80c respectively (the latter are numbered 80 on FIG. 5 and renumbered here for the sake of clarity). The allocation command is caried out by the PM itself and allocation mechanism 82 is a wired logic mechanism contained in CA 79 of the DBMM. A component (LS, CM)

Bit MIO defines the type of memory access to the peripheral.

(1) Address bits A1M to A8M specify the address of the CM concerned and the nature of the command.

(2) The real time clock interrupt is reset.

(3) Address bits A1M, A2M specify the number of the initialized timer.

(4) A1M specifies the command word sent.

(5) A1M to A8M indicate the least significant bits of the memory address.

The bits marked X do not matter.

The allocation mechanism is controlled by the PM via the following I/O instruction (refer to Table 1):

Allocation of buffer to the PM;

Allocation of buffer to the LCM;

Allocation of buffer to the CM which has direct access to this buffer.

The buffer allocated contains the execution order which is interpreted by the module responsible for processing the requested exchange. The PM is informed of the end of processing via an interrupt, when it can either analyze the information received or use the buffer concerned for another exchange.

Figure 7:
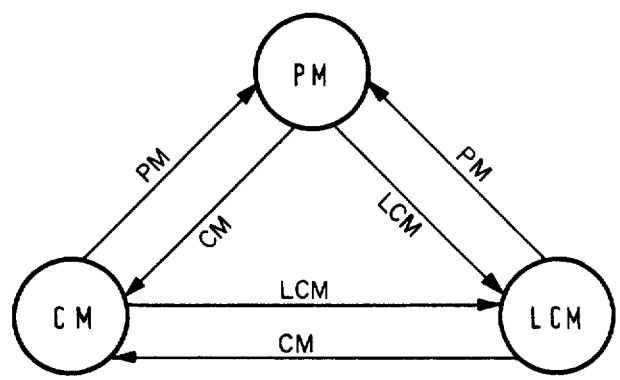
FIG. 7 shows the sequencing of the allocation mechanisms between the components concerned.

FIG. 7 shows the sequencing of the allocation mechanism between the three modules PM, LCM and CM.

51 controls transfers between the main memory of an LS and the I/O buffers 77 and 78 allocated to it. It manages the interface with the CPU 36 and simulates the operator commands from the control panel.

The interface with CPU 36 is organized on the principles set out below.

There are two possibilities on the decoding of a start C10 addressed to the SIP:

The LCM is in the exchange state. Here, the LCM loads the contents of the data bus into mail-box register 59 (FIG. 5), issues an interrupt to the PM and switches to the execution state. The LCM reverts to an exchange state when the PM executes a read instruction on the mail-box register 59 via the selection of the LCM (Table I).

The LCM is in an execution state. Here, the LCM refuses the start CIO (CR=1).

(2) There are also two possibilities on the decoding of an SST addressed to the SIP:

The LCM is not ready to provide a status word to the LS, the SST is therefore refused (CR=1).

The LCM is ready to communicate a status word to the LS via an interrupt; in this case, when the instruction SST is decoded, it is accepted and the status word is sent to the data bus.

AC 60 of the LCM controls the switching of the states needed to correctly manage the CPU/LCM interface.

A control panel operator command simulation is performed when a command block in an I/O buffer is allocated. The format of a simulated command block is shown on Table II.

TABLE II

| word 1 | 0 | 0 | no significance | | | | | | | X | | |
|--------|---|---|-----|---|---|---|---|---|---|---|---|---|
| word 2 | X | X | M C N T | I N N T | I N S L T | R P L N | X | REP | H A L T | L R | X |
| PARAMETERS | | | | | | | | | | | | |

Word 1 contains 2 bits defining a simulation command (00).

Word 2 contains the bits defining each command to be simulated:

Bit MCN: general reset (no parameter)
Bit INT: control panel interrupt (no parameter)
Bit INST: execution of a program instruction by instruction (no parameter)
IPL: initial loading program (parameters on control keys) RUN: start of a program (no parameter)
LR: loading a register, number specified in REP (4 bits)(parameters contained to be loaded)
SALT: stop the CPU
X: not used in this particular context.

These commands can, then, be simulated by program via the I/O buffers or sent directly by the control panel via multiplexer 65 (FIG. 5). These commands are interpreted to the CPU by means of a module situated within the CPU.

The exchange of blocks of information between the SIP and the LS by direct access to the memory will now be described. The exchange of blocks of information is explicitly requested by the PM from the LCM when an I/O buffer is allocated thereto. This buffer then contains the directives on the requested exchange. The format of a command block is defined in Table III.

TABLE III

| word 1 | I O X - - - - - - - - - - - - - X |
|--------|-----------------------------------|
| word 2 | Block start address |
|        | I MAD MAD Block length (8 bits) |
| word 3 | T S 28 64 X |
| word 4 | Start address in buffer no (8 bits) significance |
|        | Data |
|        | Status word | indicator

Bit IT: issue of an interrupt to the CPU as soon as the transfer operation has been performed (IT=1). Here, the status word is transferred to the bus when the SST is executed by the CPU.

MAD 128, MAD 64: two most significant bits defining the address of 128 kwords.

Bit S: indicates the direction of exchange.

The exchange mechanism with the LS is controlled by a microprogram stored in CA 60 of LCM 51. The exchange may be executed as soon as an I/O buffer is allocated to the LCM. Certain parameters defining the command block are loaded into registers 66 (memory address) and 67 (buffer address). Once the command has been executed, PM 50 is informed via an interrupt.

The communication protocols managed by CM 13 ensure the exchange of information and cooperation between the various LS connected to the communications network on the principles outlined below.

Any LS may at any time initiate communication with another (addressed mode) or several other LS (broadcast mode).

When several LS are concerned by the same message, the message is broadcast when all the LS concerned are ready to receive it.

The coherence of the message is guaranteed whatever the information flow rate of the various LS.

The same global order of events is maintained at each LS.

No interference with the other LS is caused by the connection, disconnection, failure or flow rate level between LS.

The main purpose of the communication protocol is to identify the partners concerned in communication and to maintain message coherence throughout communication. To avoid any time penalty ("overhead") due to the formal procedures and to control the information flow rate, the "two-party" communication protocol uses a logical link concept between partners. This means that, after the partners concerned have been identified and the logical link has been accepted by the destination(s) concerned, a message broken up into packets of predetermined size may be exchanged without the need for further identification and acceptance during the existence of the logical link.

Figure 8A:
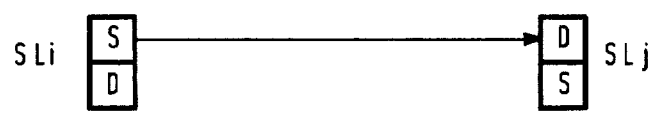
FIGS. 8a to 8d show the permitted logical links.
Figure 8B:
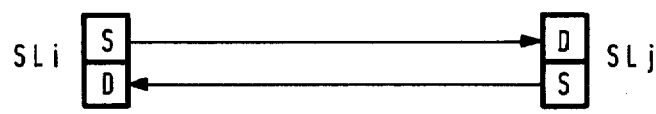
Figure 8C:
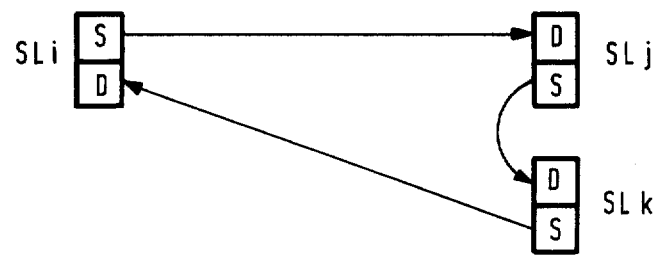
Figure 8D:
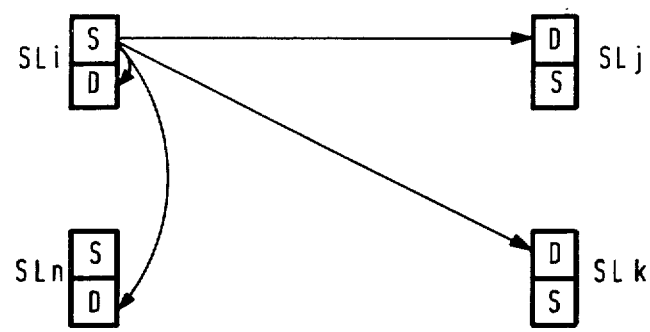

The various types of link allowed in this embodiment are shown in FIGS. 8a to 8d. FIG. 8a shows a half duplex logical link between source LSi (S) and destination LSj (D). In FIG. 8b, this logical link between LSi and LSj is bi-directional (full duplex), meaning that each LS can simultaneously transmit and receive. The link in FIG. 8c is multiple full duplex between LSi, LSj and LSk, while that shown in FIG. 8d is a broadcast link where (source) LSi broadcasts a communication to all (LSj, LSk, LSn and LSi itself).

In this embodiment, the multiple source logical link, where several source LS transmit towards a particular destination LS is forbidden in order to prevent the overloading of the destination's input buffer and to avoid complex loading of several simultaneous incoming messages.

The inter-LS logical links are predetermined at each LS. The logical links shown in FIGS. 8a to 8c are always permitted, whereas link 8d is allowed only via a programmable connection table (PCT), the purpose of which is to define the channels to be analyzed at each LS during a broadcast call. This selection is necessary in order to prevent disturbing an LS which cannot tolerate this mode of communication or do not belong to the same group of applications as the source involved.

The exchange mechanisms between the SIP 11 and CM 13 are now described.

The SIP uses its I/O buffers (256 words) to communicate with the CM via the SIP/CM interface described in the Appendix. An I/O buffer contains the directives, parameters and possibly the data to be transmitted. The CM is capable of interpreting and executing the command received. After execution, the CM loads word concerning the execution into the I/O buffer which had contained the command. The CM has direct access to the I/O buffers allocated to it. A buffer is allocated to the CM by the issue of an I/O instruction (write) to it. The contents of the bus then specify the address of the buffer to be processed, and its nature. An end of execution of signalled to the SIP by the issue of an interrupt from the CM. The SIP may then specify the address of the buffer containing the result by executing an I/O instruction (read). Two output buffer and two input buffers may be simultaneously allocated to the CM. This permits bi-directional transfers, simultaneous processing of a block of each kind (input and output) and connection with the stand-by buffers as soon as the current buffers have been executed. The input/output buffers may be located in the whole of the addressable memory space accessible to the SIP/CM bus (64kwords).

Input/output instructions used: Write Command

This instruction is used to synchronize the communication module (CM) for the execution of a command explicitly stored in the associated I/O buffer. A distinction may be made between four different commands:

(1) Connection of an LS to the communications network. Here, the parameters concerning the intended communications are provided.

(2) Disconnection of LS.

(3) Data transmission, taking the form of a request for transmission of a block of data (less than 64 kwords) specifying the output parameters.

(4) Data receiption, taking the form of the provision of an empty block (less than 64 kwords) usedd to receive incoming data. Information on the SIP/CM bus during the execution of this instruction:

Bus addresses (SIP→CM)

| no significance |
|---|
| 1 1 1 1 1 1 1 1 $C_6^M$ $C_5^M$ $C_4^M$ $C_3^M$ $C_2^M$ $C_1^M$ $C_2^D$ $C_1^D$ |

CM1 to CM6 specify the address of the CM CD1, CD2 indicate the nature of the command defined below.

| CD2 | CD1 | Nature of command |
|---|---|---|
| 0 | 0 | Data transmission (indirect) |
| 0 | 1 | Data reception (indirect) |
| 1 | 0 | Command specified on data bus (direct) |
| 1 | 1 | Connection (indirect) |

During a direct command, the data bus specifies the command. In the other caee, the data bus contains the address of the buffer to be executed. Definition of data bus during a direct command CD2, CD1 = 1 0→Data bus

| D16 | D15 | | |
|---|---|---|---|
| 0 | 0 | DEST. ADDRESS (6 bits) | G P C (8 bits) |

GPC send a general purpose command to the defined destination.

This command is interpreted bby the CM and may be used for actions depending on the CM program.

| D16 | D15 | | | D1 |
|---|---|---|---|---|
| 0 | 1 | Source address (6 bits) | no significance | 0/1 |

D1 = 0 connection of the specified source (creation of a logical link)

D1 = 1 disconnection of the specified source (suppression of a logical link).

| D16 | D15 | | |
|---|---|---|---|
| 1 | 0 | Source address (6 bits) | no significance |

General disconnection from the communications network (e.g. the sources works in isolation).

Read Status (SST)

This instruction is used to synchronize the SIP after the CM has executed a command sent to it. On receipt of an interrupt from the CM, the SIP executes a Read Status instruction and thus recovers the address of the executed buffer. Information on the SIP/CM buses during the execution of this instruction:

Bus addresses (SIP→CM)

| no significance |
|---|
| 1 1 1 1 1 1 1 1 CM6 CM5 CM4 CM3 CM2 CM1 0 0 |

CM1 to CM6 specify the CM address. Data bus (CM→SIP)

| Address of the buffer executed in the Write command. Connection block for the SIP to the communications network: | | |
|---|---|---|
| word 1 | Connenction | Status word (16 bits) |
| word 2 | X————————X | PSI (8 bits) |
| word 3 | X————————X | TTV (8 bits) |
| word 4 | X————————X | MNN (8 bits) |
| word 5 | X————————X | MORYN (8 bits) |
| word 6 | X————————X | RTV (8 bits) |
| word 7 | X————————X | MIRYN (8 bits) |
| word 8 | Connection block length (CTL) | |
| word 9 | (6 bits) S L No.   X————————X   0/1 | |
|  | (6 bits) S L No.   X————————X   0/1 | |
| word i | L S No.   X————————X   0/1 | |

Block definition:
PSI size of packet
TTV value of the transmission timer watchdog used to determine ($\theta T$)
MNN indicates the maximum number of RNR permitted during which a source LS will repeat its call after reception. This timer makes it possible to detect the permanent and abnormal occupation of a called LS. RNR is a signal defining that the destination (receiver) is not ready to accept a transmission.
MORYN maximum number of retries in output mode, defines the maximum number of retries on a parity error or on detection of AB before signalling the impossibility of transmission to the reset higher level.
MIRYN maximum number of retries in input mode on a parity error or detection of AB before signalling impossibility of reception to the next higher level.

In broadcast mode, the LS No. identifies the connected or disconnected LS, with a maximum number of 64 connections being possible. The least significant bit defines whether or not there is a connection.

$\theta R = RTV.FD$ indicates the maximum permissible time interval between the transmission of two words by an originating LS. This timing makes it possible to detect a failure in the transmitting LS.

$\theta T = TTV.FD$ indicates the maximum time interval after which and connected LS must have replied to a call (ASK). This timer makes it possible to detect a failure in the called LS during an addressed call and triggers data transmission on a broadcast call (synchronization).

FD is a clock located in the TM.

The method of connection makes it possible to define closed groups of users(applications) and to forbid the broadcast mode for systems with no filtering mechanism (SIP) based on the local capacities.

In order to modify the connection parameters, a disconnection must be made before a connection is made specifying a new parameter value may be made. After a connection, the SIP may transmit. Definition of the transmission block

| word 1 | W B TSW (status word transmission) |
|---|---|
| word 2 | Data block length (16 bits) |
| word 3 | Address of data block to be transmitted (16 bits) |
| word 4 | C1 C2 Dest. address Communication (6 bits) level priority |
|  | Data Block |

⇐ indicator

W await RNR in broadcast mode
If W=0, on reception of 1 RNR, the system transmits the messages to the LS which are ready
If W=1, the system waits on reception of 1 RNR and retries the call
B=1 broadcast mode
B=0 addressed mode
In the addressed mode, the destination address specifies the destination LS. In the broadcast mode, if destination address ≠0, the message is intended for all. C2, C1 indicate the situation of the block in the message as described below.

| C2 | C1 | Block situation |
|---|---|---|
| 0 | 0 | Intermediate |
| 0 | 1 | Start of message |
| 1 | 0 | End of message |
| 1 | 1 | Message complete |

The communication priority level (8 bits) is used in the event of conflicts (selection of highest priority).

After a transmission, a block defining the result of the transmission is constituted.

| word 1 (TSW) | 0 0 SL No. (6 bits) X - - - -X S3 S2 S1 |
|---|---|
| word 2 | RODBL |
| word 3 | RODBA |

The result of the transmission is loaded into the TSW (word 1) of the transmission block.
S1=1 network not operational
S2=1 called LS abnormally occupied
S3=1 transmission fault on the network.
The number of the LS causing the problem in broadcast mode is also loaded into TSW.
RODEL defines the current length of the data block remaining to be transmitted (loaded in word 2) in the event of a fault.
RODBA defines the current address of the data block to be transferred in the event of a fault (loaded in word 3).

After a connection, an LS may receive a transmission from another LS either in reply to a transmission or because a particular LS has something to transmit.

DEFINITION OF THE RECEPTION BLOCK

| word 1 | RSW = 0 |
|---|---|
| word 2 | Length of reception block allocated to the CM |
| word 3 | Reception block address |
|  | Free space for reception of data |
| RSW | Reception status word initially at zero. |

DEFINITION OF THE RESULT OF A RECEPTION BLOCK

| word 1 RSW | Source address (6 bits) X————X S3 S2 S1 |
|---|---|
|  | X————————————————X |
|  | X————————————————X |
|  | C2 C1 Source address Packet length (8 bits) Packet |
|  | C2 C1 Source address Packet length (8 bits) Packet |
|  | 0 0 0   0 0   0 |

The result is loaded into the RSW (word 1).

S1 = 1 network not operational
S2 = 1 transmission error
S3 = 1 reception fault on the network In the event of a fault, the source address is loaded. Words 2 and 3 in the reception block are kept unchanged. The data per packet are loaded into the space allocated to the CM. The meaning of C2 C1 is as defined. Several packets may be received, each defined by its length and source address. At the end of a packet, the word loaded with zeroes defines the end of reception.

The command will implicitly be deemed to have been executed:

a. in the input buffer is full;
b. after the end of reception of the current packet if another buffer is allocated
c. on reception of an end of text (ETX);
d. on detection of a fault.

THE ARCHITECTURE OF THE FUNCTIONAL COMMUNICATIONS LAYER AND THE COMMUNICATION MODULE

A distinction may be made between two types of word:

data words which are not interpreted (processed) by the CM (CM transparency);

the supervision (control) words making possible the management of the communication protocol by the CM.

The format of a word is thus defined below:

| 16 bits |
|---|
| C K Data or supervision |

C parity bit
K type of word; K=0, data; K=1, supervision.

Table IV defines the coding and the functions of the supervision words needed to control the logical links between the sources and the destinations.

TABLE IV

| Supervision Code | | | |
|---|---|---|---|
| C 1 0 0 | Address destination | Communication level | Request to send a packet in a message (ASK). |
| C 1 1 0 | Address destination | GPC Code | General purpose command (GPC). |
| C 1 1 1 1 1 1 1 1 1 1 1 1 1 1 1 1 | | | Initialization word (IW). |
| C 1 1 1 | Address destination | 0 0 0 0 0 0 0 0 | Destination not ready (RNR). |
| C 1 1 1 | Address destination | 0 0 0 0 0 0 0 1 | Destination ready in addressed mode (RRA). |
| C 1 1 1 | Address destination | 0 0 0 0 0 0 1 1 | Destination ready in broadcast mode (RRB). |
| C 1 1 1 | Address destination | 0 0 0 0 0 0 1 0 | Abort communication (AB). |
| C 1 1 1 | Address destination | 0 0 0 0 0 1 1 0 | Signal requesting a break in a logical link (BR) |
| C 1 1 1 | Address destination | 0 0 0 0 0 1 0 0 | CM synchronization (SY). |
| C 1 1 1 | Address destination | 0 0 0 0 0 1 0 1 | Retry packet command (RY). |
| C 1 1 1 0 0 0 0 0 0 1 0 0 0 0 0 0 0 | | | IDLE |
| C 1 0 1 | Reserved | Communication level | Call to all (broadcast ASK) |

ASK sent by the source to request the establishment of a logical link either to one addressed destination or to all.

GPC general-purpose command sent by the source and used for the remote control of certain parts of the LS.

IW sent by the source during the initialization phase, and to synchronize the phase lock loop (PLL) on the optical bus and to ensure the transmission of the words in the channels allocated to the LS.

sent by the destination when a communication request is refused due to its temporary inability to store a complete packet.

RRA sent by the destination and indicating the acceptance, after selection, of a communication in addressed mode.

RKB sent by the destination and indicating the acceptance, after selection, of a communication in broadcast mode. This supervision is used by the destinations which have lost synchronization in order to resynchronize themselves.

AB sent by the destination and used either to abort (cancel) a supervision or a data packet on error detection, or to abort a logical link because of the abnormal silence of a source.

BR sent by the source and used to interrupt or break a logical link at the end of the transfer of a packet, either because the source is not ready to transmit a new packet, or when the last word of a message has been sent.

SY sent by the source and used to synchronize all the destinations in order to prevent dispersion of the replies (RR) in the broadcast mode.

RY sent by the source and used to indicate that the next data pocket is a recovered packet.

The physical interfaces between the SM and the SIP, the CM and the TM, are defined in the Appendix.

DESCRIPTION OF THE CONTROL MODULE

Figure 9:
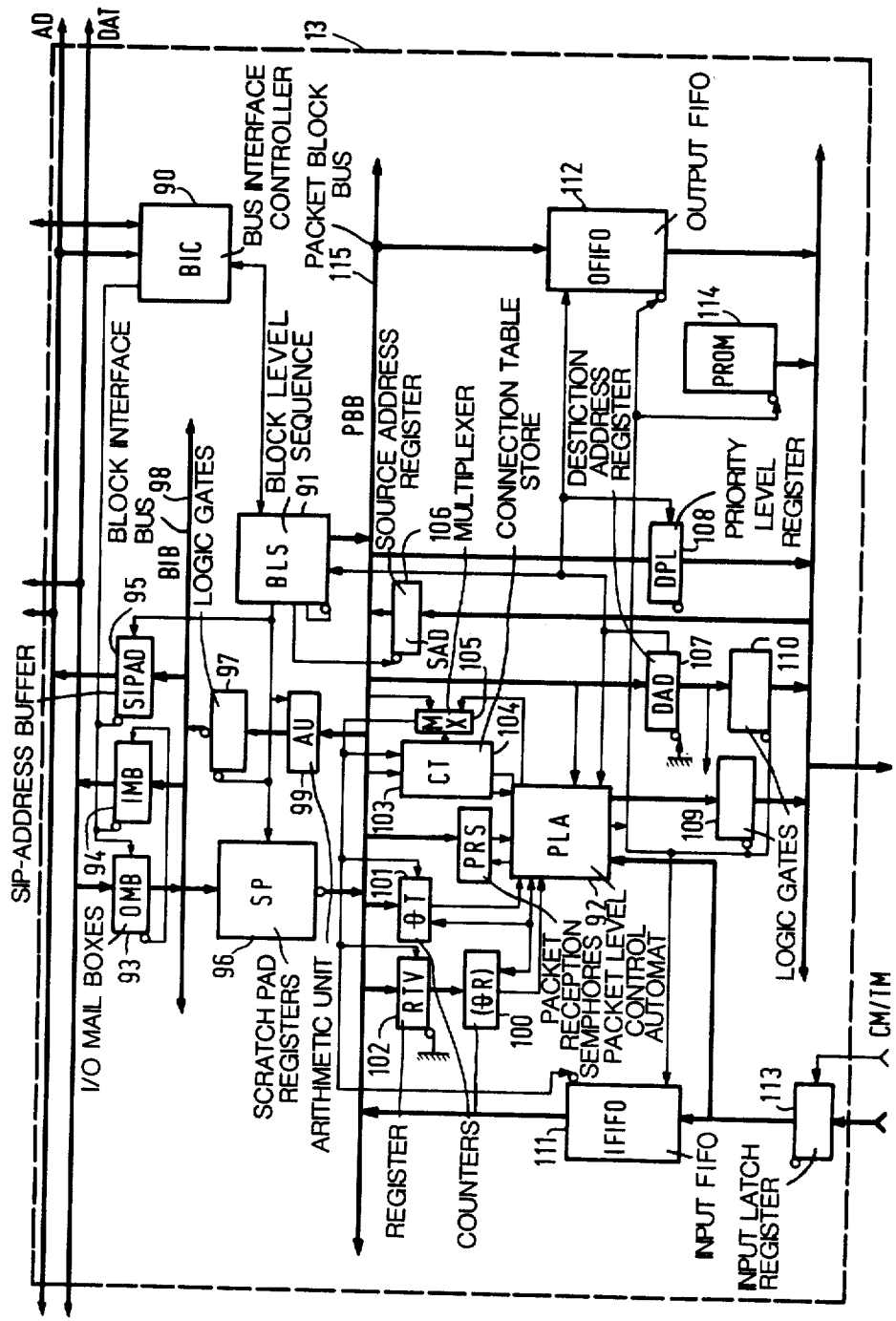
FIG. 9 is a block diagram of the CM showing the main components and their connections.

FIG. 9 is a functional block diagram of CM 13 and shows the main components with their connections (data, address and control). Basically, CM 13 is a physical communications channel between SIP 11 and the communication network via TM 15, controlled by three main components operating in parallel: bus interface controller with the SIP (BIC) 90, block level sequencer (BLS) 91 and packet level automat (PLA) 92.

BIC 90 controls the SIP/CM interface, interprets the commands from the SIP and access is on the SIP/CM interface for the direct exachange of data between the mail-boxes (MB) of the CM and the input/output buffers of the SIP.

BLS 91 analyzes and executes the commands from the SIP and returns the results thereto as soon as the commands have been fully executed or when abnormal events occur. The commands accepted by the BLS 91 are: connection of an LS to the communication network, transmission of a data block, reception of a data block, issue of a general-purpose command (GPC), connection or disconnection of the LS to and from a defined remote LS, and disconnection of an LS from the communication network, as already described.

Moreover, the BLS assumes the data exchange when an error is detected and also retries a call (ASK) on a replay RNR. The maximum number of retries is defined in the connection block.

PLA 92 controls the logical links under the directives of BLS 91.

The other components of FIG. 9 will now be briefly described. The output (OMB) and input (IMB) mailboxes are represented by 93 and 94 and the SIP address buffer (SIPAD) by 95. A group 32 registers of the "scratch pad" type (SP) is shown at 96 and memorizes parameters. Logic gates 97 provide the interface to the internal bus block interface bus (BIB) 98, while the arithmetic unit (AU) is shown by 99. Counters 100 and 101 represent the two clocks for determining θR and θT respectively. Transparent register 102 preserves the value RTV. A packet reception semaphore (PRS) defining the size of the packet on reception is shown at 103 and a memory 104 (256 words × 1 bit) contains the connection table (CT). Multiplexer (MX) 105 provides multiple access to the CT. The current source address is loaded into register (SAD) 106 which is used at the end of transfer of a packet. A register 107 (DAD) specifies the address of the destination, and register 108 (DPL) the priority level of the communication in output mode. Logic gates 109 and 110 form the CM/TM interface (address, source and destination), while FIFO 111 and 112 (first in, first out-type memory) are the input (IFIFO) and output (OFIFO) FIFO, each capable of storing at least one complete packet of data. An input register (latch) is shown as 113, and a PROM (programmable read-only memory) containing the command field of the supervision words as 114. Internal bus PBB 115 (packet block bus) provides the interface between the block and packet levels.

Figure 10:
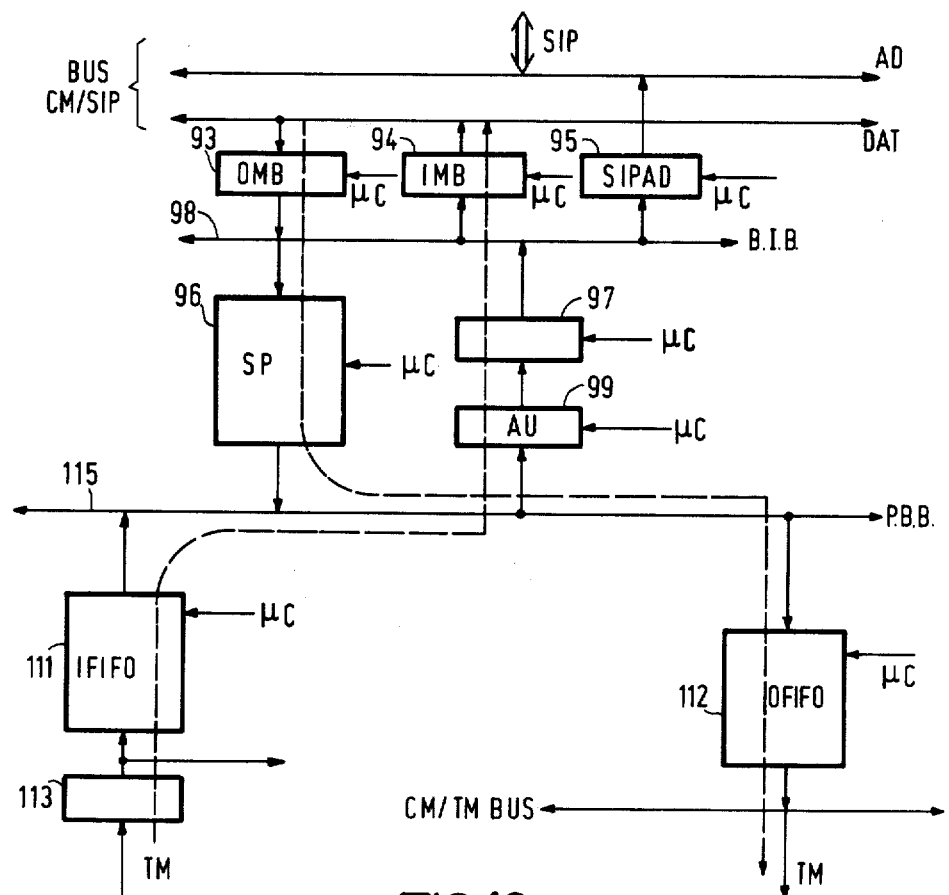
FIG. 10 is a synoptic diagram showing the data paths through the CM.

FIG. 10 is a partial diagram showing the data path through the CM. The data coming from a selected source (input data) are transferred by PLA 92 from input register 113 into IFIFO 111 (RR is sent to the source when IFIFO has sufficient unused capacity to store a packet). The data pass through IFIFO 111, and BLS 91 effects transferring a data word to the input buffer of the allocated SIP via AU 99, logic gates 97 and IMB 94. IMB 94 is controlled via BIC 90 which requests bus CM/SIP and carries out the physical transfer of the data word. The current address of the SIP input buffer is loaded into address register (SIPAD) 95 by BLS 91.

In the output mode, as soon as OFIFO 112 has the unused capacity to store a word, an output request is sent to the BLS which, in turn, asks the BIC to transfer a word from the output buffer of the SIP to OMB 93. Once the word has been loaded into OMB 93, the BIC activates a "flag" (bit) to inform the BLS, which controls the transfer of the data word through SP 96 into OFIFO 112. The data word passes through OFIFO and is sent to the communication network by the PLA as soon as a complete packet has been loaded into OFIFO, this being done by means of a transmission request (RTS) activated by the BLS.

The various components listed are controlled by the appropriate microcommands (μc) of the BIC, BLS and PLA. The data paths are shown in dotted lines. Arithmetic unit CAW 99 has a 16 bit counter which, may perform increment or decrement operations on a value loaded into it, with the zero transition of the value detected by a signal BORROW (transition to 1). The AU is used to update the addresses and the lengths of the data blocks being transferred (input and output), to divide the blocks of data into packets, to reconstitute the packets and to count the number of retries during the transmission or reception of a block. Logic gates 17, of the three-state type, provide control over internal bus BIB 98.

The command parameters relating to the connections and transfers being executed are stored in SP 96 and updating is performed during the execution of commands. The organizations of these parameters in SP 96 is shown in table V and their definition is given below. Some addresses in SP 96 are not currently used making it possible to add other parameters or to use them for temporary operations.

The parameters PSI, TTV, MNN, MORYN, MIRYN, RODBL and RODBA are defined in the description of the exchange mechanisms between the SIP and the CM.

CTL a counter specifying the current length of CT 104. Initially, CTL is loaded with the length of the connection table during the processing of a connection command, and is decremented each time that the state of a channel is loaded into CT. When CTL is 0, its updating is complete.

CNN a counter specifying the current number of retries on a reply RNR. It is decremented each time after reception of a reply RNR during a call phase (except in state WAIT.RNR). As soon as the logical link requested has been established, this counter is reloaded with MNN. If CNN=0, a "destination occupied" status word indicating that it is impossible to transmit is sent to the appropriate higher level.

CIRYN the current number of retries on reception. This counter indicates the number of errors during the reception of a packet. It is initially loaded with MIRYN and is decremented with each error detected. If CIRYN=0, a "reception fault" status word is sent to the appropriate higher level.

CORYN specifies the current number of retries on a parity error or on AB detection during the transmission of a data packet. As soon as a data packet has been completely transferred, this counter is again loaded with MORYN. If CORYN=0, a "transmission impossible" status word is sent to the appropriate higher level.

IEPL specifies the effective length of the packet on reception used to indicate the size of the packet received, this value being associated with each data packet loaded into IFIFO.

IEPLR specifies the effective length of the packet to be recovered. This is used when a parity error is detected to eliminate the part correctly received before the error during the reception of the packet.

OEPLN specifies the effective length of the packet on transmission and allows a block to be split into packets. Initially, this counter OEPLN is loaded with PSI and each time a word is loaded into OFIFO, OEPLN is decremented. As soon as OEPLN=0, a status bit EOP (end of packet) is loaded with the last word in OFIFO AND RTS is activated.

CIEPLR a counter specifying the current value of IEPLR during the recovery of a packet.

NOBSA specifies the start address of the next output block to be transferred. This block is taken into account as soon as the current block has been transferred.

NIBSA specifies the start address of the next allocated reception block. This block is loaded with the incoming data as soon as the loading of the current packet has been performed in the input buffer.

COBSA specifies the start address of the current output block.

CODBL specifies the length of the current output data block.

NODBL defines the length of the next output data block.

CODBA defines the current address of the output data block.

NODBA defines the start address of the next output data packet.

CIBSA defines the start address of the current input block of data.

CIDBL defines the current length of the input data block.

CIDBA defines the current address of the input data block.

CWA defines the address of the word reserved for loading the characteristics relating to the packet received (source number and packet length, for instance).

TDATA defines a word reserved for the temporary stoppage of the data in transit between OMB 93 and OFIFO 112.

SLADR defines a word reserved for the temporary storage of a GPC or the destination address and its priority level in transit before loading into OFIFO 112.

BIC 90 is an automat of the "Moore" type making it possible to control the interface with the upper level, i.e. the functional layer represented by the SIP. "Moore" automats have been known and described in the art for a long time. cf. Montgomery Pfister, Logical Design of Digital Computers, John Wiley, 1963, p. 144 ff. The exact functions of BIC 90 are defined below.

On a request from BLS 91:

issue of an interrupt to the higher level (SIP) to provide a status word contained in IMB 94;

request to control the CM/SIP bus with direct access to the SIP I/O buffers to read/write a word.

On the I/O instructions from the higher level (SIP):

reply to a write command and loading of OMB 93 with the contents of the CM/SIP bus, followed by the activation of a signalling bit to synchronize BLS 91;

reply to a read command by transferring the content of IMB 94.

SP 96 is a group of 32 random-access registers (word 1 to 32). The parameters loaded into words 1 to 14 use only 8 bits of a word each, while the others use the full capacity of the word (words 17 to 32). Some words (e.g. 15, 16 and 30) are not presently used but may be used later to memorize new parameters.

Figure 11:
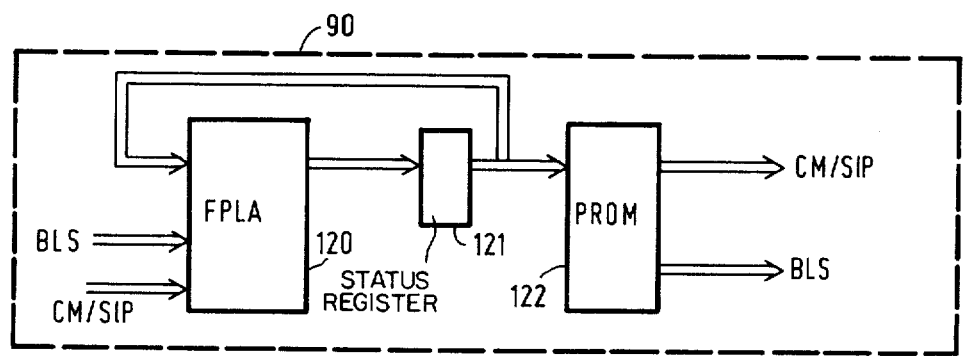
FIG. 11 shows the structure of the bus interface controller (BIC) with the SIP.

FIG. 11 shows the structure of BIC 90. In FIG. 11, 120 represents an FPLA (Field programmable logic array), the outputs of which are connected to a status register 121. In its turn, register 121 is connected to the input of FPLA 120 and a PROM 122. Depending on the existing state of FPLA 120 (content of register 121) and information from BLS 91 and the CM/SIP interface, register 121 is loaded with the next-state, which selects the appropriate micro-commands (μc) from PROM 122. These microcommands are transmitted to the components concerned, e.g. BLS 91, the mail-boxes, SP 96 and the SM/SIP interface.

TABLE V

| word 1 | PSI | ADDRESS 0 |
|---|---|---|
| word 2 | TTV | |
| word 3 | MNN | |
| word 4 | MORYN | |
| word 5 | RTV | |
| word 6 | MIRYN | |
| word 7 | CTL | |
| word 8 | CNN | |
| word 9 | CORYN | |
| word 10 | CIRYN | |
| word 11 | IEPL | |
| word 12 | IEPLR | |
| word 13 | OEPLN | |

TABLE V-continued

| word 14 | CIEPLR | |
|---|---|---|
| word 15 | | |
| word 16 | | |
| word 17 | NOBSA | |
| word 18 | NIBSA | |
| word 19 | COBSA | |
| word 20 | CODBL | |
| word 21 | RODBL | |
| word 22 | NODBL | |
| word 23 | CODBA | |
| word 24 | RODBA | |
| word 25 | NODBA | |
| word 26 | CIBSA | |
| word 27 | CIDBL | |
| word 28 | CWA | |
| word 29 | CIDBA | |
| word 30 | | |
| word 31 | TDATA | |
| word 32 | SLADR | ADDRESS 31 |

Block Level Sequencer (BLS) 91 executes the commands from the higher level. These are executed with the aid of the BIC and PLA working in parallel with the BLS. The commands from the higher level are communicated directly from the BIC to the BLS which executes them and sends a status word to the higher level at the end of execution. During execution, the BLS processes the events coming from PLA level. The BLS can transfer data in both directions and chain the data blocks (transmission and reception).

Figure 12:
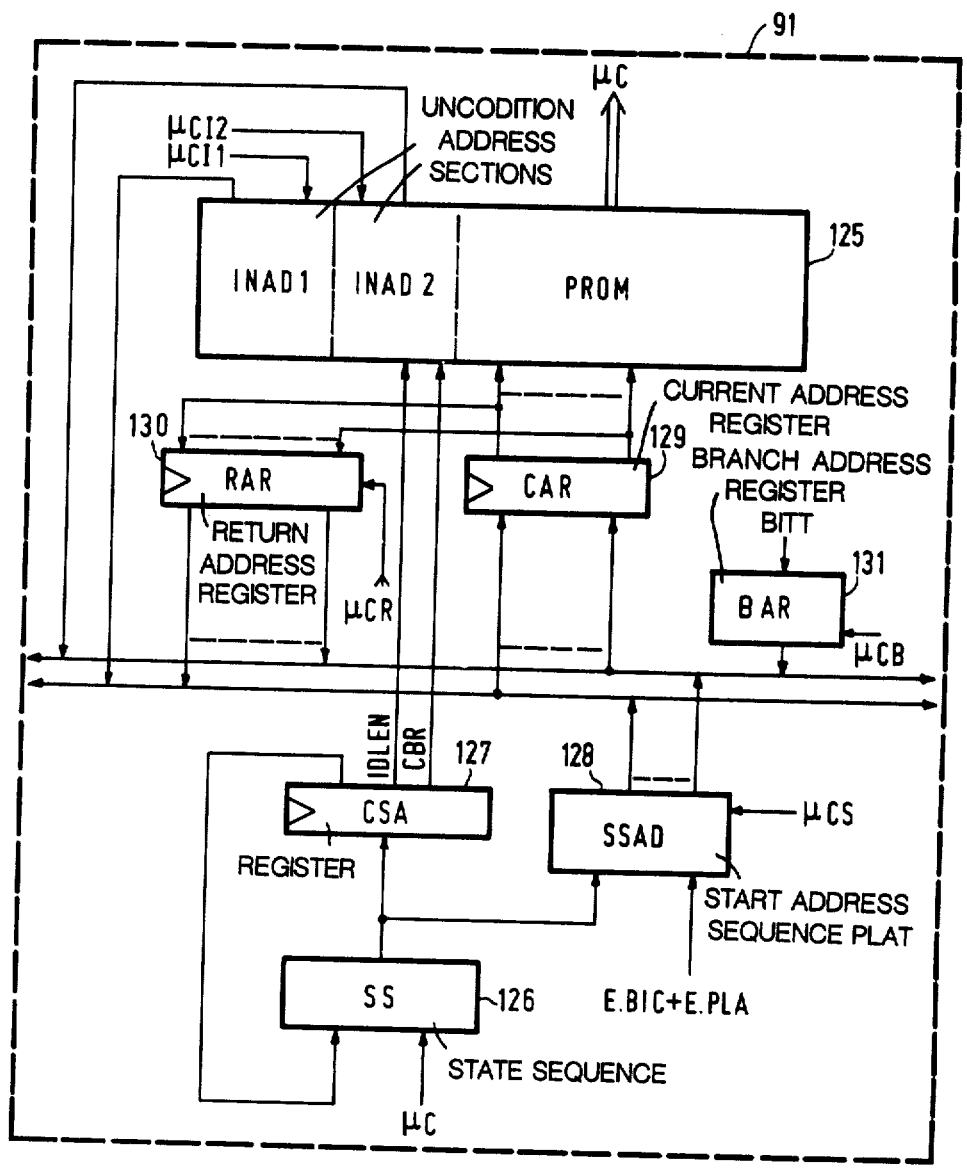
FIG. 12 shows the structure of the block level sequencer (BLS).

FIG. 12 shows the structure of BLS 91, which is a microprogrammed automat. The capacity of microprogrammed PROM 125 is at least 1024 W×40 bits and contains all the micro-commands to control the various sequences and functions controlled by the BLS, i.e. the micro-commands and events transmitted to BIC 90 and PLA 92 and to state sequencer (SS) 126 of the BLS which is an FPLA. State sequencer 126 switches to the next state as a function of its current state stored in a register (CSA) 127 and the micro-command from PROM 125.

The start addresses of the sequences to be executed are loaded into address start sequence FPLA (SSAD) 128 either by micro-commands (in the idle state) or as a function of the state of the sequencer and the events from BIC 90 and PLA 92 (E.BIC+E.PLA). These addresses, which are taken into account at the end of the current sequences, are transferred into the current address register (CAR) 129, which operates directly on PROM 125. The latter has a section associated with the micro-commands (32 bits) and unconditional address sections INAD1 and INAD2 (4 bits each); INAD1 and INAD2 are controlled by micro-commands μc11 and μc12 when a direct address is provided. A priority command from the BIC must be executed during the execution of a BLS sequence; each command from the BIC via SS 126 (shown by CBR) has the highest priority in order to clear the OMB. Here, the contents of INAD1 and/or INAD2 are concatenated (compacted) with the CBR bit (+256 defined by the address bit CBR) and becomes the next address (branch address). The current address at the time when the sequence is interrupted is stored in a return address register (RAR) 130 so that the sequence concerned may be executed later. In the case of a conditional branch (the end of the transfer of the packet, for instance), condition bit BITT is tested in BAR 131 (branch address register), making it possible to make a conditional branch to the appropriate microinstruction. Micro-commands μcR and μcB control RAR 130 and RAR 131 respectively.

Signal IDLEN defines the most significant address bit of PROM 125. When IDLEN=0, the BLS automat is inactive and awaits a connection command (address 0-255 of PROM 125). On reception of a connection command (CBR=1), the connection sequence is executed (address 256-511). When the execution of this sequence is completed, the automat becomes inactive (IDLEN=1) and the various events may be taken into account, involving the execution of sequences located in the PROM (address 512-767). If a priority command comes from the BIC, the addressing of PROM 125 switches to zone 768-1024 (current address +256).

BLS 91 working in parallel with BIC 90 and PLA 92 controls the execution of the following sequences:

sequence 1: loading of the connection parameters from the I/O buffer of the SIP into SP 96 and CTI 104 relating to an output data block;

sequence 2: loading of the start address of the next output block into SP 96 at the start of the transmission of the current output block;

sequence 3: initialization of the transmission of the current output block;

sequence 4: division of the current output block into packets, loading of the packets into OFIFO 112 followed by a request to transmit the first packet;

sequence 5: loading of the number of retries to be executed into SP 96 if the transmission call is not accepted;

sequence 6: request for the re-transmission of the packet on the receipt of RNR from the destination(s) if, after decrementing, the retry parameter is non zero (positive). Warning to the SIP when the retry parameter reaches zero.

sequence 7: loading of the transmission clock value into counter $\theta T$ to be used if no reply is received from the destination(s) concerned by a call during a time $\theta T$;

sequence 8: retry of a transmission on detection of a transmission error if after decrementing the retry parameter does not reach zero. Warning to the SIP when said parameter reaches zero.

sequence 9: acknowledgement to the SIP of a successful transmission;

sequence 10: either the retransmission of a packet, or abort and warning to the SIP if the retry parameter reaches zero after decrementing;

sequence 11: warning to the SIP when the communication network is not operational;

sequence 12: loading a GPC into OFIFO 112;

sequence 13: updating CT 104;

sequence 14: loading the start address of a reception block into the SIP;

sequence 15: initialization of the parameters concerning the reception block;

sequence 16: assembly of the reception packets in IFIFO 111 and their loading into the I/O buffer of the allocated SIP;

sequence 17: decrementing the retry parameter in receive mode on the detection of a parity error. Switch to the retry state if said parameter is not zero, warning to the SIP if it reaches zero.

sequence 18: updating the retry and recovery parameters on detection of a parity error;

sequence 19: warning to the SIP on detection of an abnormal silence from the source;

sequence 20: assembly of the reception packets in IFIFO on detection of a retry request from the source, followed by their loading into the buffer of the allocated SIP;

sequence 21: warning to the SIP when the communication network in reception mode is not operational.

PLA 92 consists of the following four components:

transmission automat (TA) effecting the transmission of the packets under the control of BLS 91;

reception automat (RA) for selecting (controlling the start of transmission) and for receiving valid packets;

word level automat (WLA) for transmitting words of various types (data, GPC, destination and source supervision, etc.) in the appropriate LS channels, said words coming from TA and RA;

a decoder for decoding the information from the TM.

Figure 13:
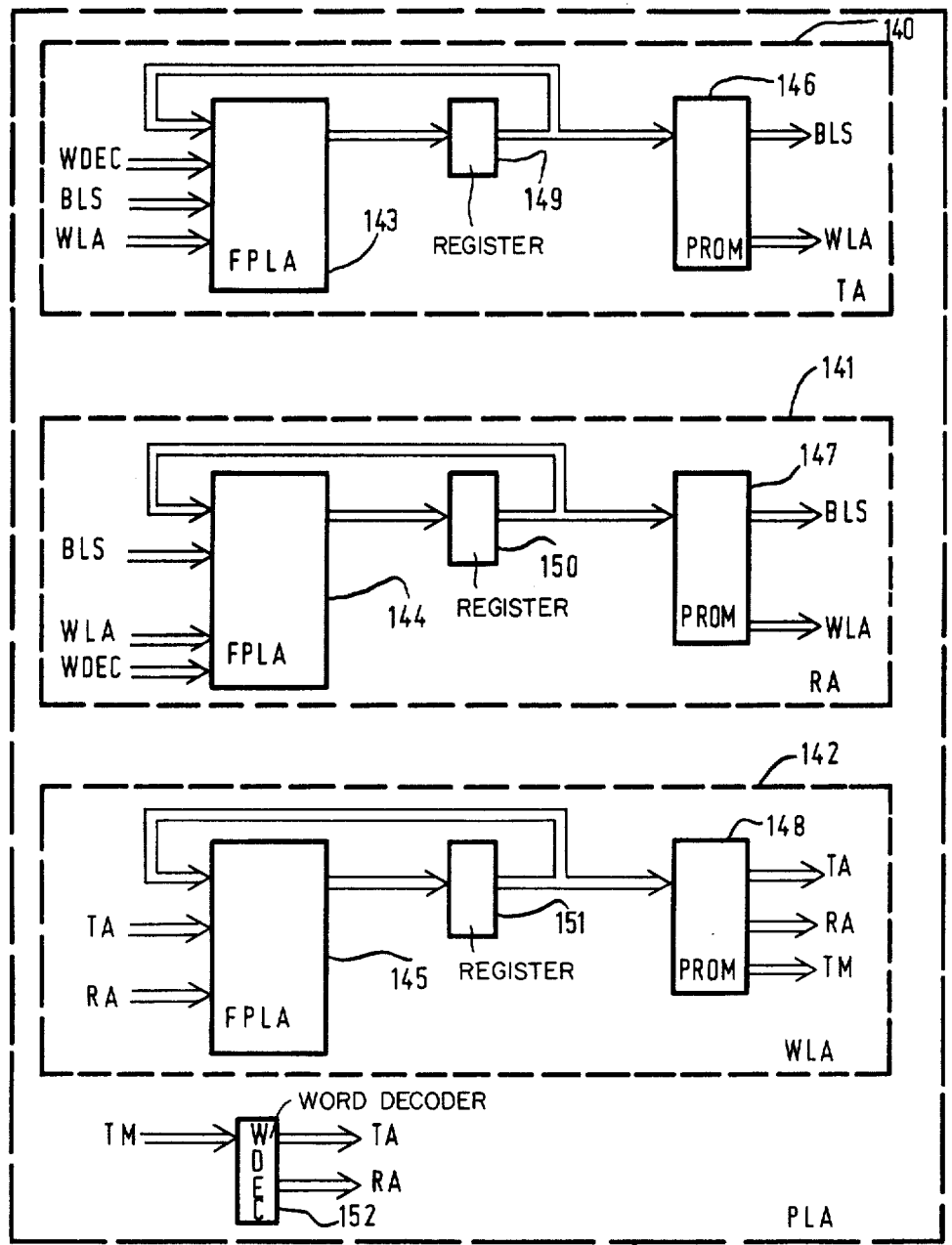
FIG. 13 shows the structure of the packet level automat (PLA).

FIG. 13 shows the structure of PLA 92. All the automats of the PLA are of the "Moore" type as already described for BIC 90 (FIG. 11). In FIG. 13, automats TA, RA and WLA are represented by 140, 141 and 142 respectively. The FLPAs and PROMs of TA, RA and WLA are shown as 143, 144, 145 and 146, 147 and 148 respectively. The status registers linked with the FPLA (input and output) and the PROM of each automat are shown from 149 to 151. The information from the TM is decoded by a word decoder (WDEC) 152. The communication between the automats and the higher (BLS) and lower (TM) levels is described in Table VI below.

TABLE VI

| Automat | Incoming from | Outgoing to |
|---------|---------------|-------------|
| TA      | BLS           | BLS         |
|         | WLA           |             |
|         | WDEC          | WLA         |
| RA      | BLS           | BLS         |
|         | WLA           | WLA         |
|         | WDEC          |             |
| WLA     | TA            | TA          |
|         | RA            | RA          |
|         |               | TM (interface) |

TA 140 consists of two specialized elements, automat TPA responsible for transmitting packets and automat TTA responsible for analyzing and synchronizing the supervisions coming from the destinations. Both automats operate synchronously. The TA controls the following main phases of the logical links in the addressed and broadcast modes: REDY (ready to transmit), CAL (request to communicate with destination(s)), CALAG (call again to destination(s) not ready), SND (transmit a packet), WAT (await a coherent reply), CLOS (closure of the logical link) and DEL (delete the data already correctly transmitted in appropriate conditions).

RA 141 controls the selection mechanism relative to the destination status, i.e. ensures that the next logical link and the reply sent to the source are made as a function of the current status of the destination (idle or occupied state), the type of logical link (addressed or broadcast) and the type of logical link already established (addressed or broadcast). Moreover, the RA is operative for resynchronizing the destination in the broadcast mode in the event of a loss of synchronizm by analyzing the replies from the other synchronized destinations. Automat RA controls the sequences of events needed for receiving valid packets or, otherwise, if a packet is not correctly received, to warn the appropriate modules (e.g. the SIP, BLS, etc.). In this case, either the packet concerned is retransmitted by the source, or the communication is abandoned if transmission is impossible.

WLA 142, in response to a request from the TPA of the TA, loads the appropriate channels with the transmission information (data or supervision) or the reception information (supervisions) needed to control the bidirectional logical links. The reception supervisions have a higher priority than the transmission supervisions.

Figure 14:
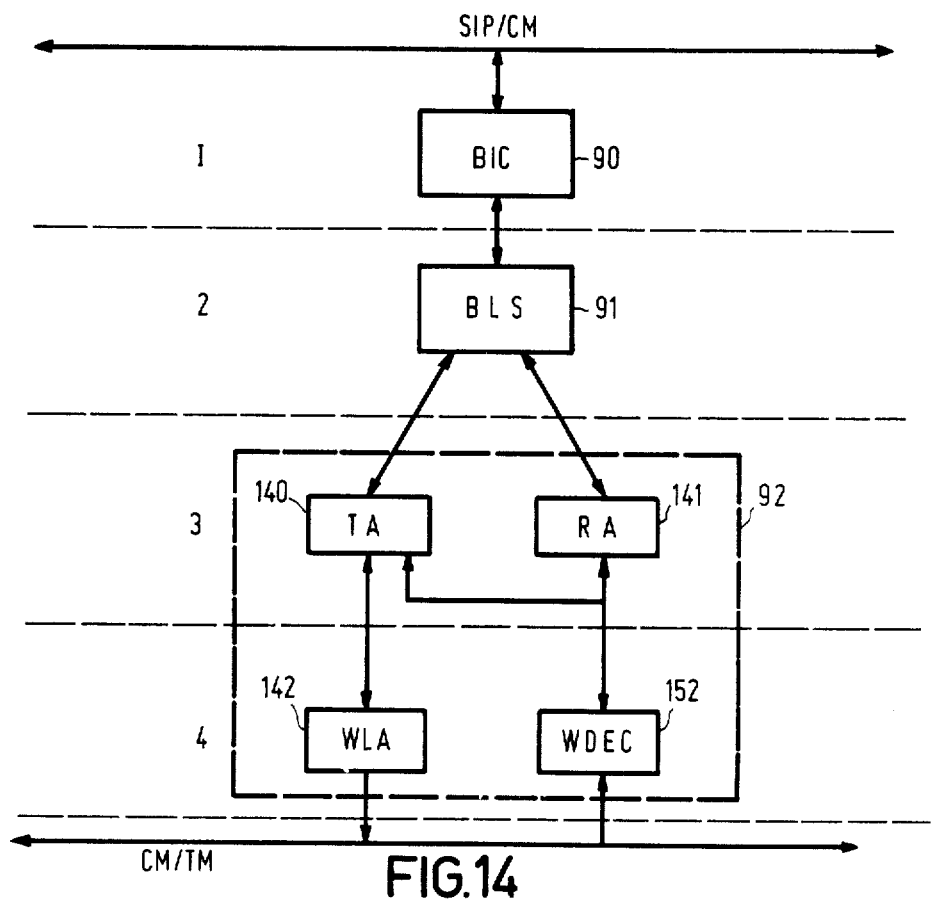
FIG. 14 is a synoptic diagram of the CM from the point of view of control.

FIG. 14 is a synoptic diagram of the CM from the view point of control. At level 1 (BIC), the physical (SIP/CM interface is controlled by BIC 90. At level 2 (block), BLS 91 provides full duplex direct access of the SIP I/O buffers, control in the event of a retry or fault, and divides blocks into packets. At level 3 (packet), the communication protocols are controlled by TA 140 and RA 141 of PLA 92. At level 4 (word) the transmission and reception words of various types and the physical CM/TM interfaces are controlled by WLA 142 and WDEC 152 of PLA 92. The arrows indicate the directions of control and communication between the various components and levels. At each level, particular events define the communication with the higher and lower level.

FIG. 15 is a synchronization diagram of the CM/TM interface. The frames and the sub frames or channels in a frame (FS) are provided by the TM. Each frame (F) consists of N transmission sub frames T1, T2, ... TN and N reception sub frames R1, R2 ... RN, where N depends on the number of LS linked to the communication network.

Initialization phase

The initialization phase (synchronisation and insertion of the data in the channel or sub frame) is signalled by ECM (end of insertion) from TM, which is reset as soon as the TM is operational. If the TM is no longer operational (shift or desynchronization), event NOTOP appears, ECM is set to 1 and information on the status of the TM is sent to the SIP.

Data reception phase

This phase is indicated by the signal RCM=1 from the TM. During this phase, all the words received are stored in a D-type register of WDEC 152 on the rising edge of FCM (reception clock from the TM) and analyzed until the next rising edge (address, code, etc.). The reception data from the TM consist of 18 bits (16 data bits A00 to A15, +1 parity bit P, +1 bit specifying the presence or absence of an error E).

Data transmission phase

The TM supplies the CM with a reference pulse REFM making it possible to prepare the data in advance so that they can be transmitted to the frame selected by the CM (3 sub frames ahead). The CM may use several non-consecutive subframes depending on a fixed allocation made at each CM. Depending on the subframes allocated to the CM, the later may send a transmit request (RTS) for the transmission of words which must be sttable during RTS. The TM transmits by a transmission clock FREFM. The transmission data from the CM consist of 17 bits (16 data bits A00 to A15, +1 procedure bit K). By way of example, FIG. 15 shows the transmission of data in frame T2. The division of a Frame (F) into the transmission and reception phases allows all the LSs wishing to communicate to transmit into their own subframes or channels during the transmission phase, whereafter the TM retransmits the same information during the reception phase, allowing all the LSs to receive the communications intended for them. During the transmission phase, WLA 142 is responsible for synchronization, i.e. the generation of RTS and the stability of the data. During the reception phase, WDEC 152 stores and analyzes the reception words.

Figure 16:
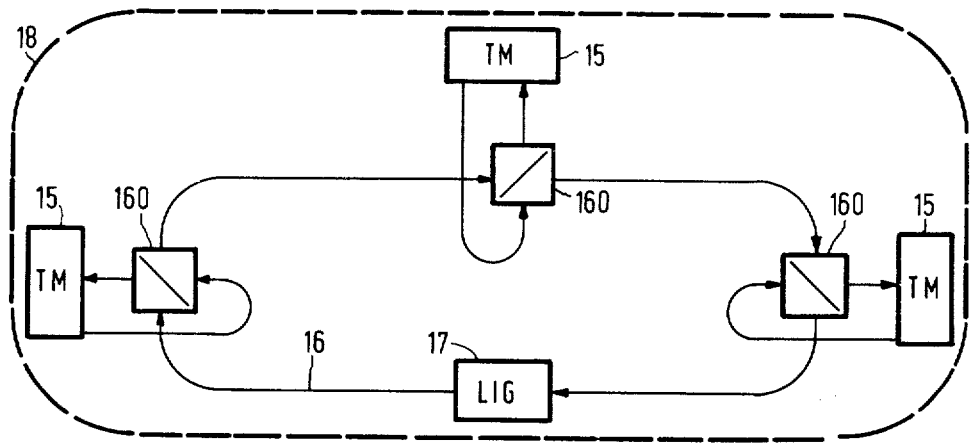
FIG. 16 is a synoptic diagram of the transport layer.
Figure 17:
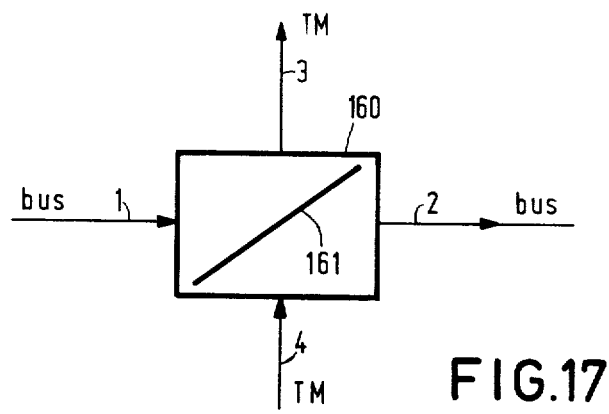
FIG. 17 shows the coupler between the TM and the optical bus.

Physical transport layer 18, shown in FIG. 16, consists of an optical bus 16, transmission modules TM 15, Looping Unit (LIG) 7 and a passive coupler 160. Optical bus 16 consists of graded-index optical fibers with a core diameter of 50μ and a plastic-sheathed cladding diameter of 100μ. Its numerical aperture is 0.2. The total allowable length of the bus is a few kilometers. It is designed to provide an interconnection between a maximum of 8 LSs, each operating at a flow rate of about 350 kwords/sec. Passive coupler 160 is a four-way X-type connector as shown in FIG. 17 with a separator 161 with a mirror finish determining the coupling coefficient. For power budget reasons, the coupling coefficient of the four-way coupler differs from ¼, the signal seen at 2 coming from 1 must have the same amplitude as that seen at 2 coming from 4 (two-level modulation), the signal seen at 3 from 1 is much lower than that seen at 3 from 4. Transverse paths P3,1 and direct paths P3,4 can then be separated by limiters. TM 15 and LIG 17 are needed to provide the synchronization and physical transport of the information bits on the optical bus.

Figure 18:
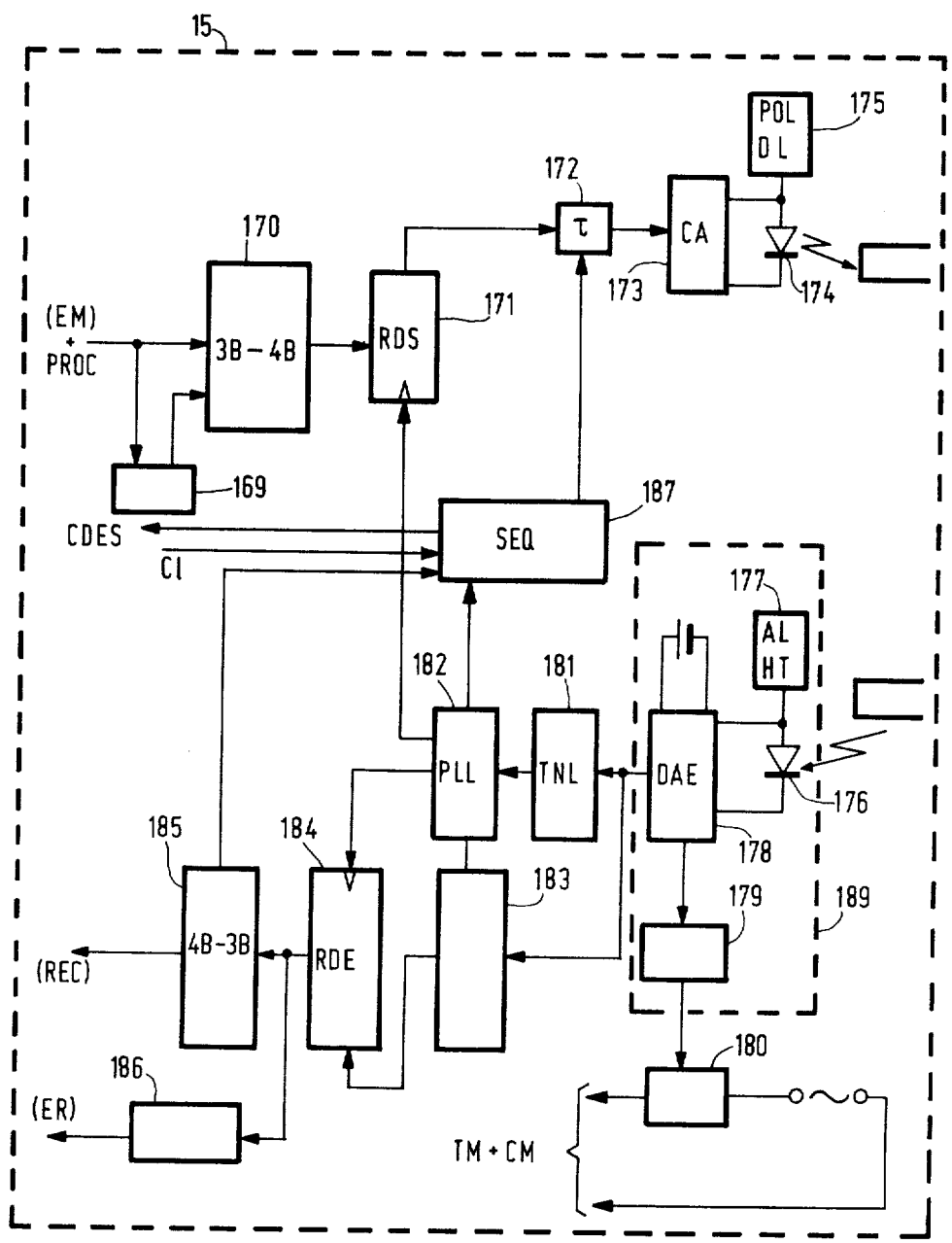
FIG. 18 is a block diagram of the TM showing the main components and their connections.

FIG. 18 is a functional block diagram of TM 15, which consists of two parts:

(1) A logic part, with the following functions:
synchronization at bit level;
synchronization at word level;
synchronization at frame level;
time base;
coding and decoding;
multiplexing and demultiplexing;
initialization and time locking;
error detection.

This part largely consists of ECL 10000 logic due to the high transmission speed required.

(2) An analog part providing the following functions:
transmission and electro-optical conversion;
reception and opto-electronic conversion;
clock recovery;
signal regeneration;
synchronization detection.

In the transmission mode, the data from CM 13 to be transmitted by TM 15 are coded (in the so-called 3B-4B code) for the following reasons:

maintaining the DC component constant (i.e. as many levels 1 as 0);
use of symbols reserved for frame headers;
facilities for recovering the clock on the data flow.

Code 3B-4B shown in Table VIa is a binary block code which transforms a binary word of length 3 (b1, b2, b3) into a coded word (a1, a2, a3, a4) consisting of 4 binary symbols. This code is very useful in optical transmission for the reasons given above and because the redundancy in the code reduces the error frequency. There are two possible modes for this code.

TABLE VIa

| Binary word | Code 3B-4B | |
|---|---|---|
| | Mode 1 | Mode 2 |
| 0 0 0 | 0 1 0 1 | 0 1 0 1 |
| 0 0 1 | 1 0 0 1 | 1 0 0 1 |
| 0 1 0 | 1 1 1 0 | 0 0 0 1 |
| 0 1 1 | 1 1 0 1 | 0 0 1 0 |

TABLE VIa-continued

| Binary word | Code 3B-4B | |
|---|---|---|
| | Mode 1 | Mode 2 |
| 1 0 0 | 0 1 1 1 | 1 0 0 0 |
| 1 0 1 | 1 0 1 1 | 0 1 0 0 |
| 1 1 0 | 0 1 1 0 | 0 1 1 0 |
| 1 1 1 | 1 0 1 0 | 1 0 1 0 |

Code 3B–4B is implemented using PROM (32 words×8 bits each) 170 and transforms 18 bits into 24 bits. A parity bit is calculated in a circuit 169 on the words issued by the CM and added to the 17 information bits. The coded information is then serialized in an output shift register (RDS) 171 and transmitted to the optical fiber via a delay unit 172, making it possible to adjust the positioning of the data word in its frame (initialization procedure). Analog dimer circuit (CA) 174 applies it possible to apply the signal to the laser diode (DL) 174, which is polarized and regulated by a polarization and regulation unit (POLDL) 175. Laser diode (DL) 174, with its wavelength of 0.85 μm provides the electrooptical conversion to the optical fiber.

In the reception mode the opto-electronic data conversion (detection) is performed by an avalanche photodiode (PDA) 176. A DC-DC converter, unit ALHT 177, produces the high voltage (about 200 V) needed for the diode and stabilizes the avalanche gain against the temperature and power supply fluctuations. The converted signal is then amplified and regenerated by an amplification circuit (DAE) 178. The amplified signal may thereupon be applied to a command integrator (COMTRIAC) 179 facilitating light detection which controls the application of power to the rest of the TM and CM via a triac 180.

The output signal of DAE 178 is treated in a non-linear manner by a unit (TNL) 181 in order to produce light rays at a frequency which is a multiple of the bit frequency. The rays are applied to a phase lock loop (PLL) 182 containing a voltage control oscillator (VCXO) making it possible to keep the local clock (TM) in synchronism with the clock of LIG 17. The bit clock thus recovered is applied to a decision circuit 183 providing for the recovery of the data flow received in series, where the threshold and sampling instant are controlled. The series-parallel conversion is performed by shift register (RDE) 184 and the 24 data bits in parallel are applied to a decoder 4B-3B 185, also consisting of PROM (32 words×8 bits each). Parity is calculated on the data received and compared, in a comparator circuit 186, with the parity bit calculated on transmission. If there is a difference, an error signal (ER) is sent to the CM.

State sequencer (SFQ) 187, which is a programmed automat, controls the initialization sequence undertaken by LIG 17 and manages the transmission/reception frame by detecting the header and counting the bits received. It supplies the clock and status information to the CM. Decoder 4B-3B, 185 decodes the header, the synchronization words and the absence of information and communicates them to the state sequencer. The part of the TM continuously powered by a bank of accumulators is represented by 189.

Figure 19:
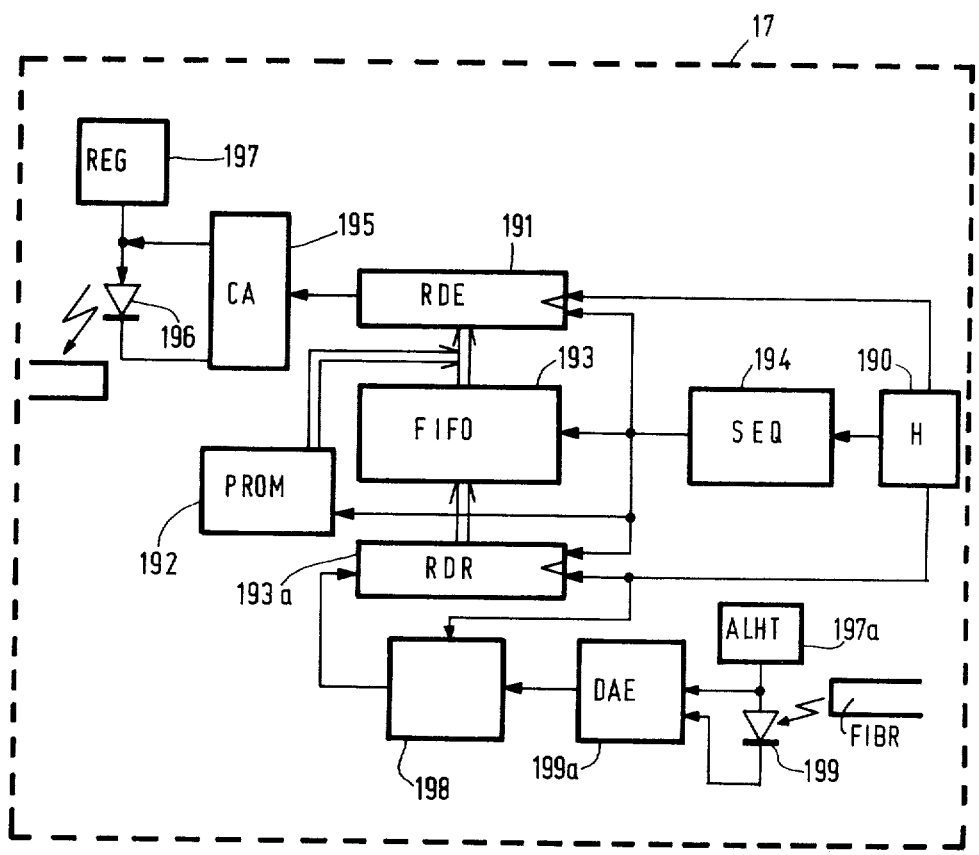
FIG. 19 is a block diagram of the LIG showing the main components and their connections.

FIG. 19 is a functional block diagram of the LIG, 17. The main functions are:

Managing the initialization facilitating the locking and synchronization of the PLL and the proper transmission of data in the channel(s) allocated to the LS.

Systematically sending a transmission frame followed by a reception frame. These frames contain a number of channels (24 bits) which are statically shared between the interconnected LS.

Erasure of the reception frame on its return.

An example of transmission/reception frames is shown below.

| Header | S1 S2 S3 S4 S5 S6 S7 S8 | S1 S2 S3 S4 S5 S6 S7 S8 |
|---|---|---|
| | Transmission frame | Reception frame |

The empty channels or subframes in the transmission frame are filled as they pass in front of the LS to which they are allocated, if said LS have information to send.

The channels are allocated by counting from the header (modulo N), where N is the number of transmission channels and by positioning a bit at 1 in an addressed PROM by means of the channel number to indicate that the channel is allocated to the LS. Decoding is anticipated so that the CM may send a transmission request to the TM early enough to transmit a word in the channel allocated to it, as already described.

In FIG. 19 a master clock (H) 190 issues pulses at bit frequency (140 Mbit/s), and is connected to a transmission shift register (RDE) 191 containing 24 bits to constitute channels. This register RDE 191 is loaded either with bits issued by a PROM 192: header, synchronization word, blank (absence of light) during the synchronization and transmission phase, or with the information words received in FIFO 193 to be repeated in a reception frame. FIFO 193 is used to store a complete reception frame if it arrives while a transmission or reception frame is in transit; this frame is loaded into FIFO 193 via a reception shift register (RDR) 193a in turn controlled by clock 190, and a decision circuit 198. The length of the frame to be stored depends upon the loop length. Status sequencer (SEQ) 194, which is a programmed automat, sequences the initialization and the transmission/reception of the frames.

In transmission, laser diode (DL) 196 of the type already described for the TM receives the binary flow after passing through drive circuits (CA) 196. DL 196 is polarized and regulated by a regulating unit (REG) 197 of the same type as that described for the TM. On reception, master clock (H) 190 is applied to a decision circuit 198 so that the information bits received may be properly sampled. This information received by avalanche photodiode (PDA) 199, of the type used for the TM, is amplified and regenerated in a detection, amplification and regeneration circuit (DAE) 199a before being applied to the decision circuit. Converter 197a (ALHT) is of the same type as that used for the TM (with the reference 177).

A distinction may be made between three phases in the initialization procedure:

Powering the LS

As soon as power has been applied to LIG 17, it generates synchronization words in all the channels.

On the detection of light in the fiber loop, reception part 189 of TM 15, which is continuously powered by a small bank of accumulators (only the circuits needed for light detection and amplification), emits a continuous signal which is sent to a triac 179 which controls the automatic powering of the rest of the transport LS (remainder of TM and CM).

Locking of the phase lock loop (PLL)

As soon as the rest of the TM is powered, the PLL locks itself to the clock bit frequency emitted by the LIG. The non-linear processing of the received signal makes it possible to recover a clock train that is synchronous with the bit frequency on the signal itself, and the clock allows the PLL producing the clock bit to be synchronized.

Adjustment of the words in the frames

After a few hundred milliseconds, once it is certain that the whole system has stabilized (power supply rise time) and the PLLs are synchronized, the LIG adjusts the words in the channels allocated to the LS. For the LIG, this consists in stopping the emission of the light in the channel in question. When the TM detects this absence of light it emits a word and checks that it is receiving this word properly without any error. If the word again received is incorrect, the TM inserts or removes a delay line increment to retard or advance the work to be inserted. A new test is carried out and this procedure is repeated until the emitted word is correctly received. The LIG also checks the transmission of the TM. As soon as it finds tha the word is inserted properly in the right channel, it steps to the next channel and so on until all the words are properly adjusted in their respective channel. As soon as the LSs are synchronized (bits and words), the LIG emits a header word which puts all the LSs into the operational mode. From now on, the LIG continuously emits a working frame as described below.

| SYNCHRONIZATION | SELECTIVE SYNCHRO. | SW EM REC |
|---|---|---|
| Powering and bit synchronization | Channel synchronization | Working phase |
| NOTOP | | OP |

The LIG may trigger the initialization sequence whenever an LS is found to be desynchronized. The signal NOTOP is then reset to 1 and a NOTOP event is sent to the LS with current data transfer.

State sequencer (SEQ) 194 controls the functions of the LIG states essentially consisting of the three states shown above. The synchronization and header words are contained in PROM 192. The transmission frame filled by the LS is stored in FIFO 193 pending transmission after the end of transmission of the current transmission frame. The reception frames received by the LIG are erased.

The way in which the LSs co-operate to optimize sharing of global system resources and provide communication between processes will now be described. The resources are directly shared by means of a broadcast mechanism to all the distributed local systems and service requests to the local monitor of any applicable resourced within the local system. In order to relieve the local units of the functions relating to locating, selection, parameter translation, etc., a processor specializing in coordinating operating systems (SIP 11) is used. Its essential purpose, therefore, is to determine, by message exchanges with its counterpart SIPs, and as a function of the user's needs, the resources distributed over the application sites, the availability of these resources and the load on the distributed resources where each service request or command will be processed.

The SIPs control the cooperation between LSs using the mechanism already described under control of the coordination executive (CCE).

Every service request or command may be regarded as a transaction consisting of several phases and characterized by the exchanged of messages and data between the SIP before the request is sent to the local monitor selected.

A transaction consists of the following phases:

(1) Interrogation: it is addressed directly to the LS concerned when no choice need be made and when the user process can locate this resource. An interrogation is broadcast to all when a choice of M resources among N is possible or when the user process cannot localize the resource.

(2) Auto-selection: if there is no choice, the selected resource is the one which is explicitly requested. If there is a choice of M resources among N, an auto-selection mechanism is executed, during which each LS , on an examination of the replies sent, determines which number of M LS must process the service request; these M LS select themselves while the N-M others cancel the request in question. The auto-selection mechanism is made possible by a property of the local communcation network which allows all the LS to view the same global order of events, even in the event of faults. These mechanisms will be described later.

(3) Presentation: once one or more LS has (have) been selected, the service request is presented to the selected LS. For this purpose, extension monitor (EM) 42 simulates the service request by generating the image of a local process.

(4) Processing: processing is performed by a local monitor in exactly the same way as when the request comes from a local process. The end of the processing of the request returns the result to the user process (extension monitor).

(5) Result return: the result is returned to the LS in which the user process originating the request is located. This result is received by the extension monitor (EM) of this LS and communicated to the local process, which terminates the transaction.

The auto-selection phase makes it necessary to have at each SIP 11 a description, albeit succinct, of the locally available computer resources and their distribution over the whole of the competing processes of the organization. This description is given by means of tables describing the local resources and processes. The tables may be constructed during the generation of the system and reloaded when the overall system in initialized, in RAM 54 of the SIP. They may also be dynamically updated in relation to the users' needs and the evolution of the system. Parameter translation and source code nunber correspondence tables are used as well as these descriptive tables. The former are described in Tables VII to IX below, which make it possible to translate parameters from one LS to another and facilitate the search for a descrptive block in the resource descriptive tables.

TABLE VII

| Base + 0 | Global file code (GFC) | 256 words of 16 bits |
|---|---|---|
| Base + 255 | Global file code (GFC) | 0 if not assigned |

TABLE VIII

| Base + 0 | Global line code (CLC) |
|---|---|

TABLE VIII-continued

| Base + 255 | Global line code (GLC) | } | 256 words of 16 bits 0 if not assigned |
|---|---|---|---|

TABLE IX

| clear | → | 0 | No. Unit | 0 0 0 0 0 0 0 0 | |
|---|---|---|---|---|---|
| assigned | → | 1 | No. Unit | 0 0 0 0 0 0 0 1 | 512 words of 16 bits |
| | | | No. Unit | 1 1 1 1 1 1 1 0 | |
| | | | No. Unit | 1 1 1 1 1 1 1 1 | |

The local file code (SLFC)→global file code (GFC) and local line code (SLLC)→general line code (GLC) are described in tables VII and VIII.

To request a resource, each process uses a local file code (SLFC) with significance only in its own LS. Thus this number may not be used directly outside the LS without giving rise to incoherences owing to the use of the same code numbers by other LSs to request different resources. It is therefore necessary to associate a unique and distinctive global code with each resource, identifying it totally, and to make the translation for local code number to general code number and vice versa.

The first translation is made by using the SLFC→GFC conversion table in the source SIP while the second is made in the LS providing the service taking the local file code assigned to a peripheral or a file.

In the translation SLFC or SLLC→GFC or GLC, the correspondence is established when a code number is assigned to a resource.

The SIP now proposes a global code number (GFC or GLC) from among its free numbers (Table IX). If the resource in question has already been assigned by another process and already has a global code number, that proposed by the SIP is rejected and the global code already assigned to the resource is communicated to it; if the process belongs to the same domain as the resource, the SIP loads the word addressed by the local code number (Base+CN) with the global file code assigned to the resource.

If the resource in question has not yet been assigned, the global code number porposed by the SIP is accepted and assigned to the resource.

As assignation semaphore is incremented by 1 on each assignation.

If the global code number proposed is accepted, the status bit indicating that this code number is assigned is set at 1, otherwise the code number remains free (status bit at 0).

When several resources have the same name and number, they are all assigned at the same time.

The free global code table (GFC or GLC) (Table IX) contains 512 numbers from 0 to 511 concatenated with the unit number to made 512 unique global code numbers in the overall system. These code numbers are used on assignation, as described.

The system and domain resource descriptive table is shown on Table X.

System resources

When a user process requests a resource, this request inariably requires the presence of system resources in the unit responsible for processing the request. The system capabilities at each LS must thus be specified, e.g.;

type of central processor (available set of instructions);

nature of the monitor and the optional modules existing, e.g. disc operating system (DOS), Disc real time operating system (DRTM), etc.;

monitor extensions (Datacom, Data file management);

compilers (Fortran, Algol, Basic, etc.);

processors;

utilities (link editor, text editor, etc.).

The first four words of the system resource descriptor table are reserved to describe the system capabilities, each bit indicating whether a given system resource is available or not in this unit. A few examples of these system resources are described below.

General system resources: file management (FM), telecommunications procedure management, etc.

Background resources: Fortran, link editor, assembler, etc. These resources are activated and used when the current processes (foreground) are halted (batch).

Foreground resources: application user processes and resources (real time).

Domain of use

The division of the global system into application domains makes it possible to provide protection between applications by controlling the interactions existing between them through the common resources and to share the load in the various application domains.

The embodiment allows for specifying eight different application domains to which each local system resource may be allocated. Access to these resouces is permitted only for the processes belonging to the same domains. A domain is identified by a name made up of six ASCII characters. It is possible to have a domain which is open to all (OPEN). At the level of each resource descriptive block, a field of eight bits specifies the domains to which the resource is allocated:

| Example | 8 | | 5 | | | domain No. 2 |
|---|---|---|---|---|---|---|
| | ↓ | | ↓ | | | ↓ |
| 1 | 0 | 0 | 1 | 0 | 0 | 1 0 |

The resource is allocated to domain No. 2, No. 5 and No. 8; this information may be obtained by making the logical "AND" function of this field with the domain No. located in the domain description block. If the result is zero, the resource is not allocated to the domain in question.

TABLE X

| | | | |
|---|---|---|---|
| | Central processor | | Locally |
| | Monitor | ⎫ | available |
| | General system | | system |
| | resources | | resources |
| | "Background" | ⎬ | (4 words |
| | resources | | of 16 |
| | "Foreground" | | bits) |
| | resources | ⎭ | |
| Name | ⎧ Name of domain No. 1 | | Applicat- |
| of | ⎨ Name of domain No. 1 | | ion |
| field | ⎩ Name of domain No. 1 | ⎬ | Domain |
| 6 cha- | | 0 0 0 0 0 0 0 1 | No. 1 |
| racters | | | (4 words |
| ASCII | | | of 16 |
| | | | bits) |
| | Name of domain No. 8 | | Domain |
| | Name of domain No. 8 | | Applicat- |

TABLE X-continued

| Name of domain No. 8 | 1 0 0 0 0 0 0 0 | ion No. 8 (4 words of 16 bits) |
|---|---|---|

The communication mail-box descriptive table is shown in Table XI.

These mail-boxes allow the processes to communicate whatever their Application Domain. There are four possible primitives for the management of these mail-boxes:

open a mail-box (OPEN);
close a mail-box (CLOSE);

These two primitives may be executed only by the creator process.

deposit a letter in the mail-box (PUT);
remove a letter from a mail-box (GET);

Any process may send a letter to the creator process but only the latter may remove a letter. When one or more letters are waiting in the mail-box, an event is positioned to inform the creator process.

A semaphore is incremented on the receipt of a letter and decremented on the read-out of a letter. The event is maintained while the semaphore is non zero.

The descriptive block of a mail-box contains;
the address of the block in the main memory of the LS allocated to receive the letters;
the total size of the mail-box in numbers of letters;
the mail-box state semaphore;
the global code number of the creator process or the mail-box, useful for controlling access rights to the mail-box and to alert it when an event has occurred.
the name of the mail-box;
information making it possible to address the descriptive block of the next mail-box.

The descriptive tables of the user resources are shown on Tables XII and XIII.

The descriptive table of Table XII describes the peripheral resources.

Authorized Domains (1 octet): shows the known fields of use of the LS to which the resource is allocated, e.g. fields 1, 3 and 8 as shown on Table XII.

TABLE XI

| Address in memory<br>Total size of mail-box in numbers of letters<br>Mail-box state semaphore<br>Creator process No.<br>Mail-box name<br>Mail-box name<br>Mail-box name<br>Address of next block | 8 words of 16 bits<br><br>0 0 if last block |
|---|---|

Local file code (DLFC) or local line code (DLLC) (1 octet): indicates the locally used code number to ask for the peripheral to which it is assigned. If it is not assigned, this field=0.

Global assignment semaphore: is incremented on each assignment and decremented on each clearing. When the semaphore attains zero, the associated global code number may be given free.

Global code number (GCN): is unique in the global system and makes it possible to create a relation between a resource or a group of common resources and the user processes. The code number is determined on first assignment and is freed when the assignment semaphore is zero.

Global process number (GPN): indicates the global number of the process to which the peripheral is allocated (temporarily for an I/O), bit $A=1$, or attached (permanently until an explicit detachment order), bit $B=1$.

Peripheral name (DN) and number (DNO): consists of two ASCII characters followed by a two-digit number making it possible to identify the peripheral.

Example:

DF=disc
MT=magnetic tape
TC=cassette with LRC (longitudinal redundancy check)
TK=cassette with CRC (cyclic redundancy check)
.
.
.
S2=synchronous DTC controller
A4=asynchronous DTC controller
.
.
.
A8=asynchronous 8-line multiplexer Address of the next descriptive block (NLA): indicates the address of the next descriptive block. If this field is zero, this block is the last in the list.

TABLE XII

| Not used<br>DLFC/DLLC | 1 0 0 0 1 0 0 1<br>Authorized Domain<br>Global assignment semaphore | |
|---|---|---|
| B  A | GCN<br>GPN<br>DN<br>DNO<br>Not used<br>NLA | 8 words of 16 bits |

TABLE XIII

| $D_{28}$  $D_{18}$<br>DLFC/DLLC | Rights of access of the various Domains | $D_{21}$  $D_{11}$<br>Global assignment semaphore |
|---|---|---|
| B  A | GCN<br>GPN<br>FN<br>FN<br>FN<br>NLA | 8 words of 16 bits |

TABLE XIV

| Base + 0 → FC  LC | |
|---|---|
| | 256 words of 16 bits |
| Base + 255 → FC  LC | |

Table XIII shows the logical files.

Only the first word and the identification of the file differ from the peripherals. If the block has no significance (free), field DLFC/DLLC is zero. For the description of the rights of access of the domains, 2 bits are allocated per Domain (D2i, D1i), significance:

0 0=the file is not allocated to the domain in question;

0 1=the file is allocated in write only mode;

1 0=the file is allocated in read only;
1 1=the file is allocated in read/write mode; File name (FN): 6 ASCII characters identify the file.

The table of free local codes is shown in Table XIV, which contains two bits relating to the status of the file code number (FC) and the line code number (LC) designated by the address Base+code number. If the status bit is zero, the code number is free, whereas if the status bit corresponds to 1, the code number is locally assigned. The code number is used to execute the LKM locally in response to the incoming requests.

The code numbers relating to the peripherals are assigned when the system is generated, while the code numbers used for the logical files are assigned on the first assignment received using the free code numbers.

The table of chain starting addresses on general code number is shown on Table XV.

In order to facilitate the search for a descriptor block on receipt of a global code number, the blocks with the same right-hand octet are chained together and the starting address of the chain is given in the chain start address/table by a global code number, i.e. as/there will be only 63 interconnected units at the most, in the worst case 63 comparisons will have to be made of the global code numbers contained in the incoming requests with the global code numbers contained in the various descriptor blocks to find said block.

TABLE XV

| Hexadecimal (X) | 0 0 | 1st link address | |
|---|---|---|---|
| | 0 1 | 1st link address | 0 no chain 256 words of 16 bits |
| | | 1st link address | |

An example of chaining is shown below:

```
GFC X FF
7 FF  →  1 FF
         NLA  →  3 FF
                 NLA  →  12 FF
                         NLA  →  56 FF
                                 0 - - - 0
```

When a request defined by a global file code number (GFC) is received, the right-hand octet is taken to locate the start of the chain of descriptor blocks corresponding to this number. This address is contained in table XV (X FF points to the 1st descriptor block of the chain which is 1 FF); a comparison is then made between the most significant octet of the GFC received and that located in the descriptive block. If they are equal, the descriptive block of the resource requested has been found; otherwise a transition is made to the following descriptive block indicated by NLA (3FF), and the process is repeated until the descriptive block of the resource is found or until 0 is found in field NLA.

The file chain start address table for the disc file code is shown in Table XVI. This 16-word table gives the starting address of the descriptive table of the logical files belonging to the same disc for each disc (maximum: 16 discs per LS). This table is useful at assignment time to find out whether the requested file has already been assigned or not.

TABLE XVI

| 0 | 1st link address | |
|---|---|---|
| | | 16 words of 16 bits |
| 15 | 1st link address | |

The LKM requests for the DRTM-type monitor will now be described. The service requests may be classed into three groups.

a—Requests relating to a peripheral device, a logical file or mail-box.
b—Requests relating to the main memory of an LS.
c—Requests relating to programs.

Type (b) requests are not broadcast, whereas those of type (c) will be studied later. Thus, only type (a) requests are considered in this invention.

The processing of service requests and operator commands is described below.

Assignment

Two types of assignment are processed:
the assignment of a file code number to a peripheral device, telecommunications device or permanent file;
the assignment of a file code number to a temporary file;
the assignment of a file code number to a synchronous telecommunications controller (type S2).

The command sent by the operator is: AD /(hexadecimal) NN S2 30 and means assign file code NN to communications controller S2 30.

On receipt of this command, the monitor calls the extension monitor (EM) 42 to form a command block to be sent to SIP 11. This block takes the form shown in Table XVII.

TABLE XVII

| word 1 | 0 | 0 | 0 | 0 |
|---|---|---|---|---|
| word 2 | | | No. Microtransaction L | |
| word 3 | | Code Service request | | |
| word 4 | Min. number of resources M | | NN | |
| word 5 | | S | | 2 |
| word 6 | | 3 | | 0 |

Word 1 indicates the nature of the left-hand octet information block (0 0=outgoing service request) and the right-hand octet stage (0 0=first phase).
Word 2 is the local number of the microtransaction allocated to this command.
Word 3 specifies the type of service requested (assignment).
Word 4 gives the file code (NN) to be assigned to the specified resource (communications controller in this instance) in words 5 and 6 and the minimum number of resources M to be assigned (left-hand octet).

As soon as this block is formed, the extension monitor (EM) sends a command CIO indirect start to the SIP indicating the address of the command block (CBAd). Extension monitor (EM) then hands control to the monitor.

The SIP completes the command block to construct an interrogation block taking the form described in Table XVIII. This consists in transforming the local into global parameters.

TABLE XVIII

| (Nature) 0 0 (Phase) 0 0 | |
| --- | --- |
| No. Microtransaction (global) | |
| No. Assignment request | |
| S  2 | Resource |
| 3  0 | |
| M  S | Domain |
| D  S | |
| 0  0 | |
| No. global process code | Global process code |
| Process level | Consumer (Source) |

Once this block has been formed by the SIP, the latter sends it using the broadcast-to-all mechanism over the general system bus (optical bus) via the CM. The proposed general file code number (word 4) is marked as in use.

Figure 20:
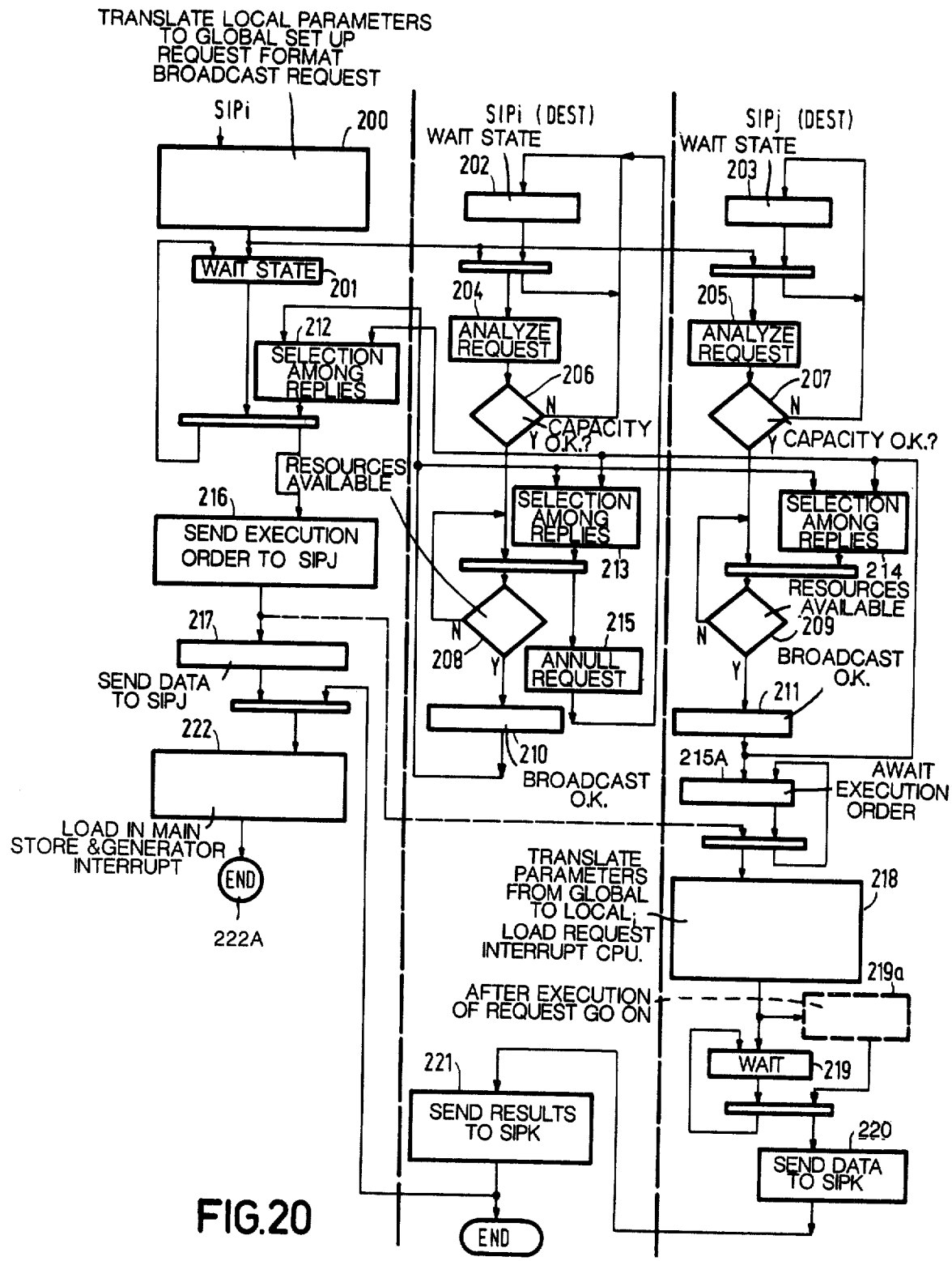
FIG. 20 is a flow-chart describing the processing of a service request by the SIP connected on a MSDS.

The broadcast-to-all mechanism is generally described with the aid of the flow-chart of FIG. 20. When the SIPi (source) receives a service request from a process located in its own LS, it takes the necessary steps, translating parameters (local into global), assembling the request in the query format (interrogation) and transmitting it to all (represented by 200) via the mechanisms for transmission already described (CM, TM, optical bus, etc.). The SIPi (source) then switches to a wait state, reference 201, this being the selection phase.

This service request is received by all the SIP connected to the general communications network and, on receipt of an incoming request, each SIP analyzes the information associated with this request. In the flow-chart of FIG. 20, the request is received by the SIPi (destination) and SIPj in the wait state, references 202 and 203 respectively. The wait state relates only to the service request. In fact, the destination SIP may be occupied by other operations.

In this invention, a request issued on to the communications network is received by all the SIPs including the source SIP, i.e. there is no privileged system in this context. The incoming request is analyzed (references 204 and 205) by every SIP for the following points:

—the definition of the request facilitates an initial screening of the LS capacities which should possess the units to process the request received; e.g. a compiler is needed for a compilation request, and communications programs are needed (network protocol and procedure) to process a telecommunications request;

—the name of the application domain makes possible a second screening giving an equitable distribution of the applications over the available units and thus over all the LS, and also makes it possible to define the possible interactions between these applications (protection and load sharing); a table of known application domains constructed at each SIP when the global system is generated (after initialization);

—a third screening process may be performed on the user resource requested by consulting a local resource descriptive table (located in the main memory of the SIP).

After these three screening processes, each SIP is capable of determining whether its LS has the capacities needed to process the request, references 206 and 207. If the result of analysis is negative, the SIP return to the wait state; otherwise, a further analysis is made to determine whether these resources are available, references 208 and 209. If they are not, the SIP awaits availability before replying. When all the resources requested are available (system and user) within an LS, an acknowledgement is sent back to all, and all the necessary resources are allocated to the source SIP, while the SIP itself switches to the wait state, references 210 to 211.

The system selects an LS from among those which have given positive replies, selecting the first one giving such a reply. The architecture of the system ensures the selection of only one positive reply by the source SIP if several destination SIPs provide a positive reply simultaneously.

Here it is assumed that the two SIPs, SIPi (dest.) and SIPj (dest.) have the resources requested and that these resources are available. SIPi (dest.) and SIPj (dest.) give positive replies via a global OK (references 210 and 211) but the reply from SIPj (dest.) is received before that from SIPi (dest.) by the SIPi (source). The self-selection mechanism makes sure that SIPj (dest.) is selected (references 212 to 214), one of the features of the communications network being that a general transmission is received by all at the same time (the same global order of events is viewed by all).

SIPk (dest.) is therefore informed by this general broadcast that it has not been selected, the request is cancelled (reference 215B) and a switch made to the wait state 202. The selected SIPj (dest.) awaits the execution order from the source SIPi, reference 215A.

Figure 21:
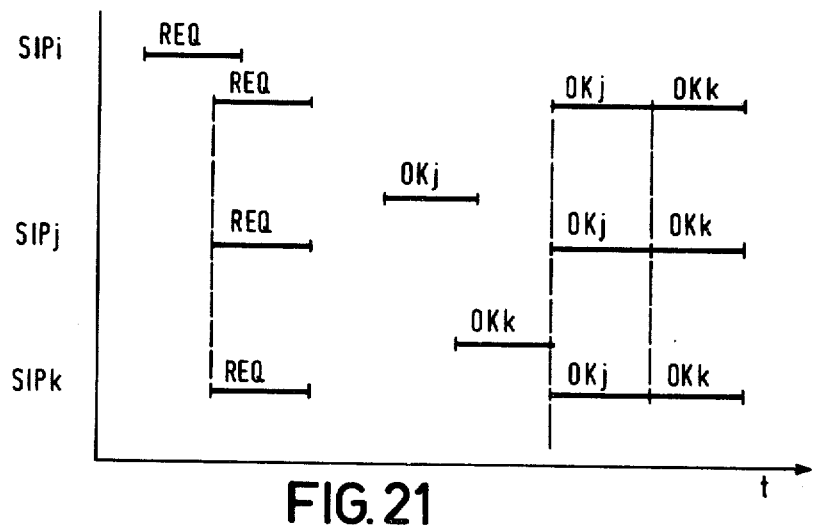
FIG. 21 shows the self-selection principle.

FIG. 21 shows the self-selection principle. Three SIPs, SIPi, SIPj and SIPk, are connected to the communications network. SIPi issues a broadcast request to all (REQ) which is received by all with a time-shift. In the next transmission frame, SIPj and SIPk give positive replies (OKj, OKk) which are received by all, but OKj is received by all before OKk owing to its position on the network, and all are therefore informed of the selection of SIPj. SIPi sends the order to execute to SIPj and SIPk is freed. The execution phase starts (described by references 216 to 221) in which the execution order is sent to SIPj, 216, data may be sent, 217, the parameters are translated from global to local, the request is loaded into the main memory of the LS and an interrupt is sent to the CPU to process the request, 218. SIPj switches to the wait state 219 and, after the request has been executed, 219a, sends the data to SIPi, 220. The results are then sent to SIPi, 221, which, in its turn, loads them into the main memory of its LS and warns it via an interrupt 222. The SIPs switch into an end state END concerning the request in question.

Figure 22:
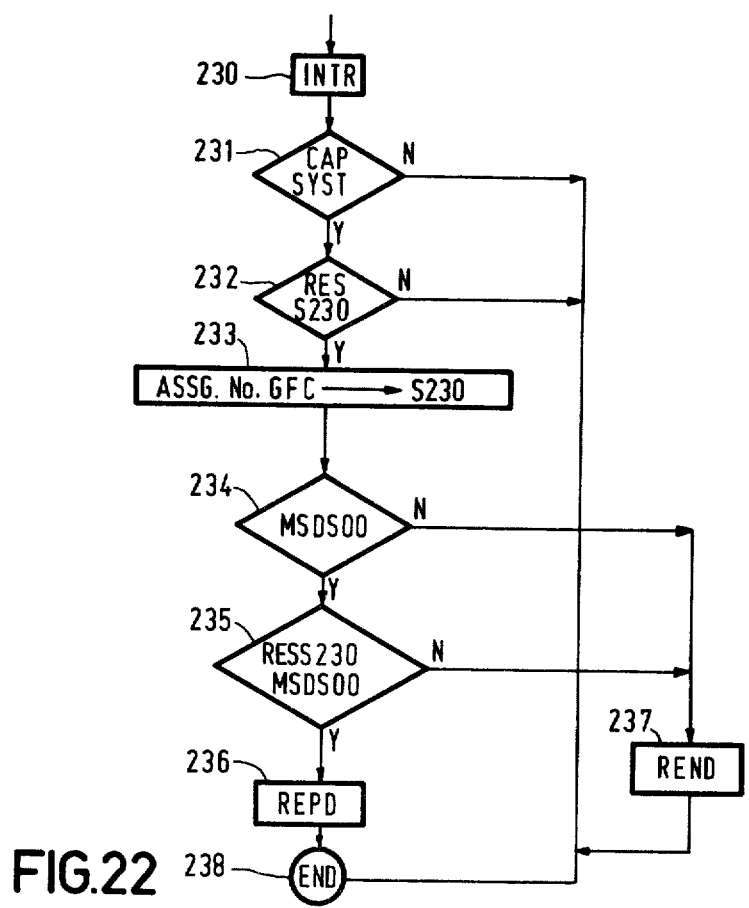
FIG. 22 is a flow-chart describing the analysis phase of a request at each LS.

In this example, the interrogation block (query) is thus received at the same time by all the LS at the coordination processors which analyze this interrogation in parallel. The analysis phase is described with the aid of the flow-chart of FIG. 22.

Test 230 (INTR) Entry to the interrogation sequence.
Test 231 (CAP SYS) This test checks that the LS has the system capacities needed to process data telecommunication requests (monitor, etc., in the system resources table). If so (Y), sequence 232 is executed; if not (N), a switch is made to END 238.

Test 232 (RES S2 30) Here a check is made to ensure that control unit S2 30 is present locally. If so (Y), the sequence for assigning the global file code number to S2 30 is performed (ASSG No. GFC→S2 30) shown by 233; otherwise (N), once again a switch is made to END 238.

Test 234 (MSDS 00) In this test, a check is made to determine whether the LS knows the field of application of the consumer process (search in the application domain table, the name MSDS 00).

Test 235 (RES S2 30→MSDS 00) Here, a test is made to see whether control unit S2 30 is allocated to field MSDS 00.

The first two tests make it possible to find out whether resource S2 30 exists in the global system. If so, the global assignment sequence is carried out (233).

A positive (REPD) 236 or negative reply (REND) 237 is then sent depending on the result of tests 234 and 235 concerning the allocation of the resource to field MSDS 00. The result shows whether the global file code proposed has been used or not. If it has not been used, in the case of a positive replay, the global file code used will be shown in order to make the link with the local file code.

Figure 23:
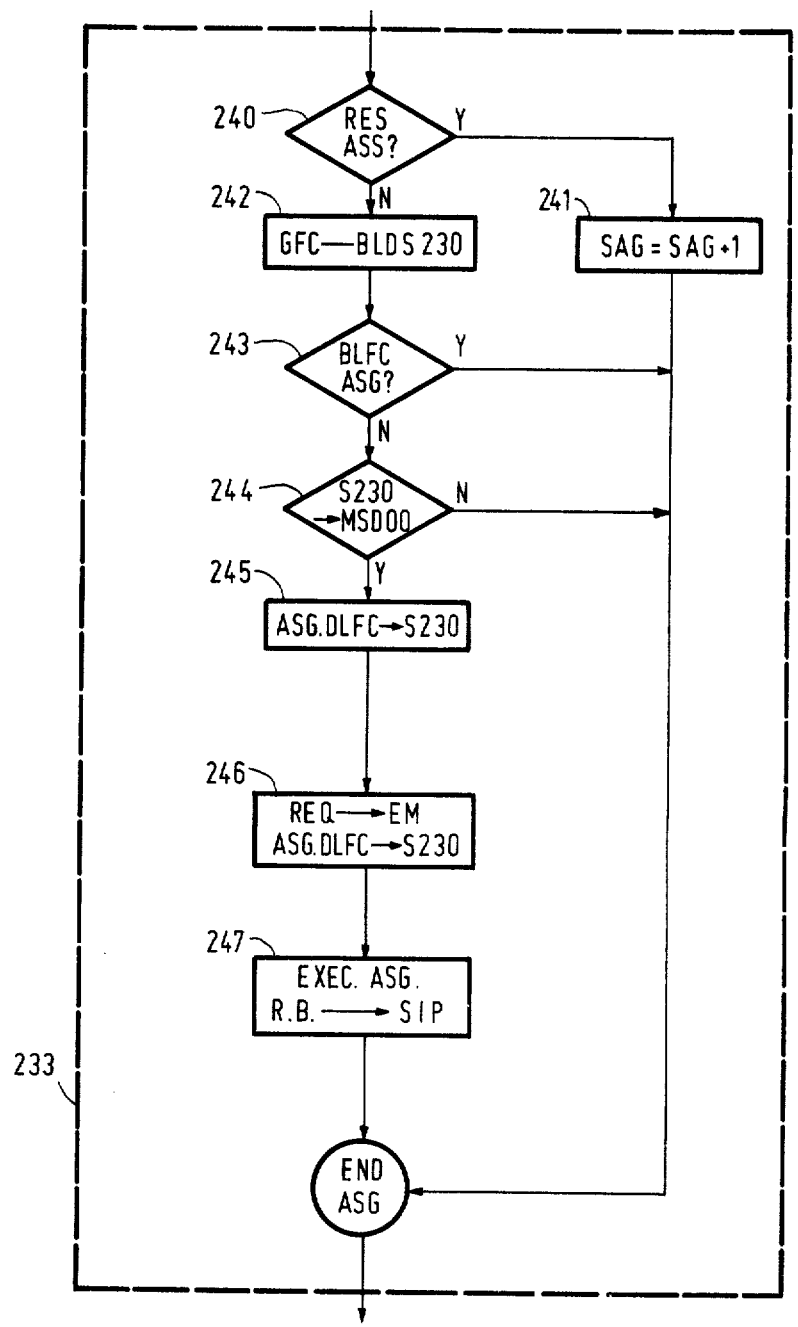
FIG. 23 is a flow-chart describing the assignment sequence of a file code number to a peripheral.

Assignment sequence 233 is described with reference to the flow-chart of FIG. 23.

Test 240 (RES ASS)
The global assignment semaphore is tested.
If=0→not assigned and sequence 242 is carried out.
If ≠0→already assigned and sequence 241 is carried out.

Sequence 241
The global assignment semaphore is incremented by 1 (SAG=SAG+1).

Sequence 242
The global file code number is stored in word 3 of the descriptive block of resource S2 30 (GFC→BLD S2 30).

Test 243 (DLFC ASG)
A test is made to discover whether the local file code number has already been assigned to this equipment (DLFC≠0). If (N), test 244 is performed, if (Y) a switch is made to END ASG.

Test 244 (S2 30→MSDS 00)
A test is made to discover whether resource S2 30 is allocated to domain MSDS 00. If (Y), sequence 245 is carried out, if (N), a switch is made to END ASG.

Sequence 245
Local assignment of a file code number to equipment S2 30 (ASG DLFC→S2 30) at the SIP level.

Sequence 246
An incoming request asks the extension monitor (REQ→EM) to assign the file code allocated to resource S2 30 (ASG.DLFC→S2 30).

Sequence 247
As soon as the extension monitor has performed the assignment (EXEC.ASG), it sends the next result block to the SIP (R.B.→SIP). The address of the result block (RB Ad) is shown in the register linked to the CIO, as shown on table XIX. The local SIP analyzes the result.

If the assignment has been executed and if the specified minimum number of assignments M has been reached, processing is ended. If the minimum number requested is not reached, a positive reply is broadcast.

If the assignment has been refused by the local monitor, the descriptive block is updated (semaphore decremented by 1), the local file code number is freed and the result is returned to the originating SIP via the broadcast mechanism (negative reply) in the format described in Table XX.

The result may be a negative reply (no assignment) or a positive one without allocation of the resource to domain MSDS 00, or a positive reply combined with allocation of the resource to domain MSDS 00.

TABLE XIX

| RB Ad | (Reply) 0 | 1 (1st phase) 0 | 0 |
|---|---|---|---|
| | | No. microtransaction | |
| | | Result | |

TABLE XX

| 0 1 | 0 2 |
|---|---|
| Microtransaction No. | |
| Result | |
| No. of global file code assigned | |

Figure 24:
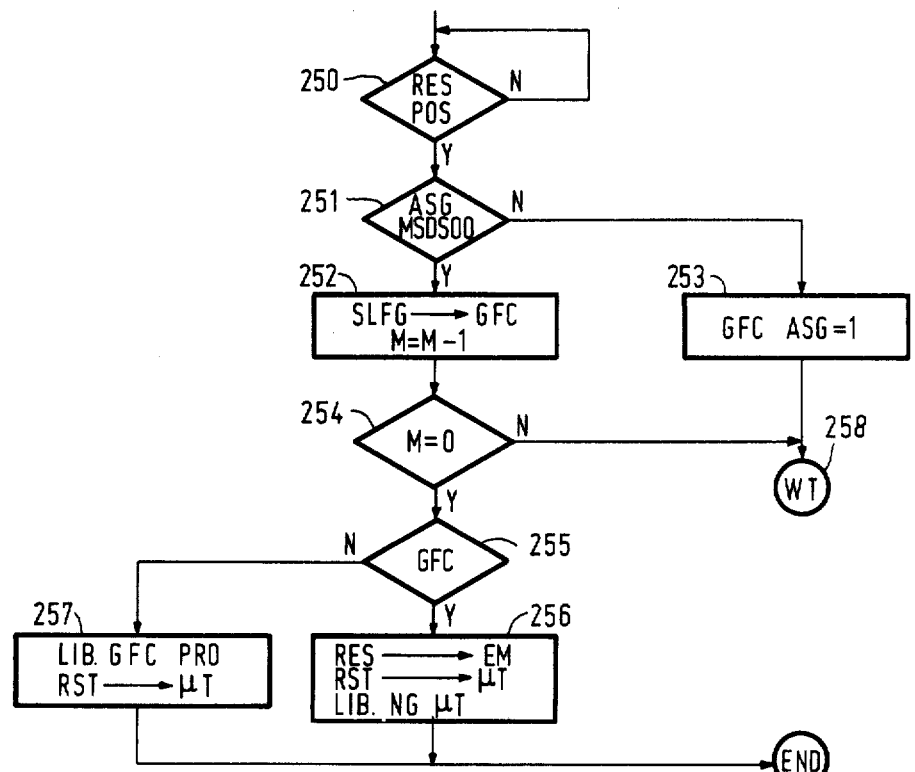
FIG. 24 is a flow-chart describing the processing by the originating SIP of a response to a request.

On receipt of this message, the originating SIP executes the sequence (type S1) described with reference to the flow-chart of FIG. 24.

Test 250 (RES.POS) The positive result is awaited.

Test 251 The assignation to MSDS 00 (ASG.MSDS 00) is tested; if yes (Y), sequence 252 is executed; otherwise (N), sequence 253 is executed.

Block 252 The global code number is loaded into the conversion table opposite the local file code number (SLFL→GFC) and the minimum number of assignments M is decremented by 1 (M=M−1).

Block 253 If the assignment to MSDS 00 has not been made in test 251, the proposed global file code assignment is stored GFC ASG=1, and a branch is made to WT, 258, where a positive reply is awaited; in fact, this is a return to the start.

Figure 25:
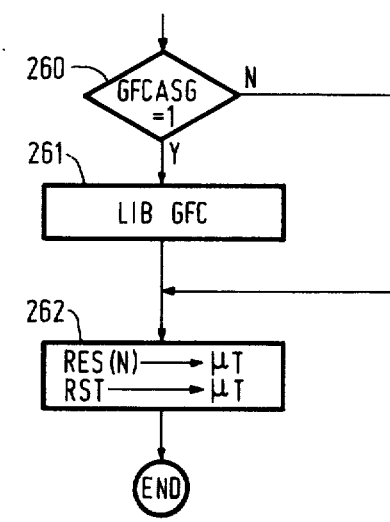
FIG. 25 i a flow-chart describing the sequence performed in the originating SIP in the event of errors.

At the moment of interrogation, a timer 58a in the SIP is triggered in order to detect failures. If the wait time has elapsed, the sequence described in the flow-chart of FIG. 25 is carried out.

Test 254 The minimum number of assignments M is tested; if M=0, test 255 is performed; otherwise the next positive reply is awaited, WT 258.

Test 255 If the proposed global file code (GFC PRO) is accepted (Y), sequence 256 is performed; if not (N), sequence 257 is carried out.

Block 256 In this sequence, in which the proposed GFC is accepted, the poitive result is communicated to the EM (RES→EM), the micro-transaction is terminated (RST→μT), the global number of this micro-transaction is freed (LIB.NG.μT) and then a switch is made to END.

Block 257 If the GFC proposed in test 255 is not accepted (N), it is immediately freed (LIB.GFC.PRO), the micro-transaction is made to FIN.

Test 260 The storing of the global file code assignment is tested (GFC ASG=1). If GFC ASG=1 (Y), sequence 261 is executed; if GPC ASG≠1 (N), a switch is made to sequence 262.

Block 261 The global file code number is freed (LIB.GFC).

Block 262 The negative result is sent to the EM (RES(N)→EM), the micro-transaction is terminated (RST→μT) and a switch is made to END.

The result is sent back in broadcast form so that the LS with the necessary capacities but which have not yet replied may perform the assignment but abstain from replying as soon as the minimum number of replies M has been reached.

On receipt of M positive results, the microtransaction is terminated, results subsequently arriving are not taken into consideration by the originating SIP (they would be identical if positive, otherwise insignificant).

The global assignment is made on a resource name, without taking into account the names of the domains on which it is carried out, while the local assignment is made on a resource name associated with a domain name.

The assignment of a file code to a temporary file will now be described. The format is LKM data space 23.

This request is significant for the assignment. The type of assignment and the associated parameters are contained in the ECB (event control block) which takes the form described in Table XXI for the assignment of a file code (NN) to a sequential temporary file located on a disc with the file code DD.

TABLE XXI

| ECB.Ad: | 0 1 | NN | |
|---|---|---|---|
| | — | DD | |
| | 0 0 | 0 0 | sequential file |
| | Not used | | |
| | Not used | | |
| | U | F | type of file |

TABLE XXII

| word 1 C.B.Ad. | (Nature) 0 | 0 (Phase) 0 | 0 | |
|---|---|---|---|---|
| | | No. Microtransaction L | | assignment |
| | Service code requested | | | |
| | No. of copies M | | NN | |
| word 5 | — | | DD | |
| word 6 | 0 0 | | 0 0 | |

TABLE XXIII

| word 1 | (nature) 0 0 | (Phase) 0 0 |
|---|---|---|
| word 2 | | |
| word 3 | No. of copies M | Assignment request |
| word 4 | Global file code No. | |
| word 5 | — | DD |
| word 6 | 0 0 | 0 0 |
| word 7 | M | S |
| word 8 | D | S |
| word 9 | 0 | 0 |
| word 10 | Global code No. of process | |
| word 11 | Process level | |

On receipt of this request, the monitor calls the extension (EM) which forms the command block described on Table XXII.

The meaning of the first four words is the same as the previous assignment (Table XVII).

Word 5 indicates the file code of the disc(s) used for the temporary file.

Word 6 indicates the type of file (0000=sequential) and the number of so-called granules requested in the case of direct access (1 granule=8 sectors, and 1 sector=205 words on a disc).

As soon as the block is ready, monitor extension EM sends an indirect start CIO to the SIP stating the address of the command block (CB Ad). The SIP completes the command block to form an interrogation block which takes the form described on Table XXIII.

Word 2 is altered by the concatenation of the unit number with the local micro-transaction number.

Word 4 indicates the proposed global file code.

Word 6 indicates the type of file.

Word 10 indicates the level of the global process code.

Word 11 indicates the global code number of the program requesting the opening of a temporary file, i.e. the process level.

Figure 26:
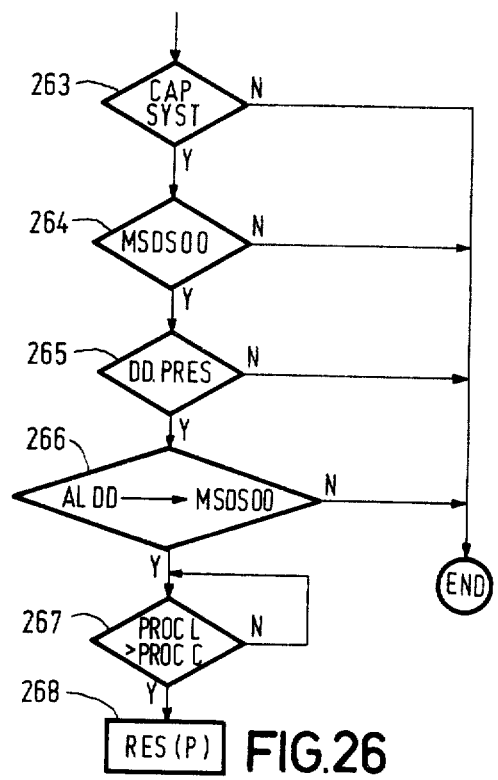
FIG. 26 is a flow-chart describing the assignment sequence of a file code to a temporary file.

The block thus made up is received by all the LS which analyze it as shown in the flow-chart of FIG. 26.

Test 263 This test (CAP.SYST) consists in checking whether the LS has the necessary system capacity to process the request. If so (Y), the next test is executed; if not (N), a switch is made to END, i.e. there is no reply to the request.

Test 264 Here a check is made to find out whether the field of application of the consumer process is known (sought by the LS in the domain table under name MSDS 00).

Test 265 This test consists in checking whether the disc with file code DD is present (DD PRES).

Test 266 This test is to check whether the disc with the file code DD is allocated to MSDS 00 (Al DD→MSDS 00).

In all the above tests, if the check is positive (Y), the next test is performed; otherwise (N), a switch is made to END.

Test 267 The local process level (PROC L) is compared with the consumer process level (PROC C) (requestor). If PROCL>PROCC, the end of the execution of PROCL is awaited before replying; if PROCL≦PROCC, a positive reply is broadcast RES(P) 268.

Figure 27:
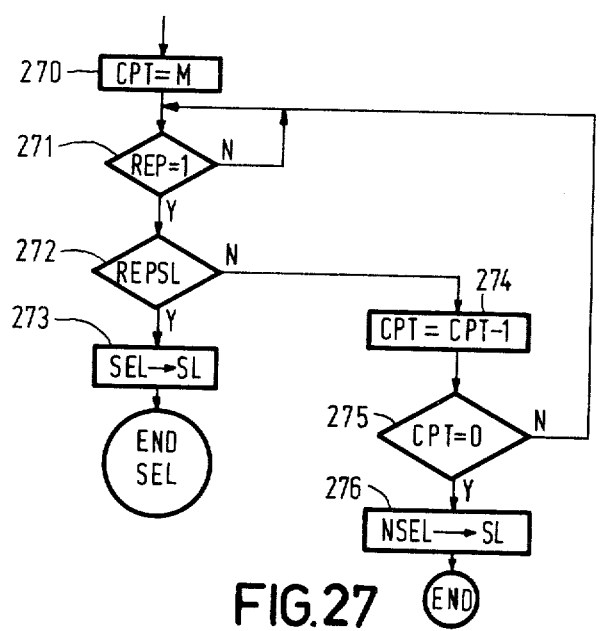
FIG. 27 is a flow-chart describing the self-selection phase.

This analysis phase lasts until self-selection has taken place or the time allocated to the timer 58a of SIP has elapsed. On receipt of an interrogation, the number of copies required is stored. The replies relating to the corresponding micro-transaction are analyzed as described in the flow-chart of FIG. 27. This is the self-selection phase.

Block 270 At the state of the transaction, a counter CPT is initialized with the value M (CPT=M), where M is the minimum number of resources requested.

Test 271 A positive reply is awaited (REP=1). On receipt of a positive reply REP=1, test 272 is performed.

Test 272 This test (REP LS) makes it possible to determine whether the reply received came from itself (Y) or another LS (N). If (Y), sequence 273 is carried out; if (N), sequence 274 is performed.

Block 273 In this sequence the LS is selected (SEL→LS) and a switch is made to the end of selection (FIN SEL) where the transaction passes to the next phase.

Block 274 If the result of test 272 is (N), counter CPT is decremented (CPT=CPT−1) and test 275 is performed.

Test 275 The status of counter CPT is tested. If CPT=0 (Y) sequence 276 is carried out; if CPT≠0 (N), a branch back is made to test 271.

Block 276 The LS is not selected (NSEL→LS), the transaction is ended for this LS and a switch is made to END.

TABLE XXIV

| | |
|---|---|
| Indicates a temporary file ⟶ | Not used |
| | DLFC    Not used |
| | GCN |
| | 1  1  GPN |
| | Not used |
| | Not used |
| | Not used |
| | NLA |

When a member of N local systems LS reply positively (CPT=0), if the reply from the LS lies within the first M replies, it will be selected; otherwise analysis is ended and the micro-transaction is regarded as having been processed thereby.

If the LS is selected, an incoming request is sent to the monitor extension (EM) which transforms it into format LKM data 23, having previously constituted an ECB with the parameters provided by the SIP.

The monitor performs the assignment and returns the result to the monitor extension, said result then being sent to the SIP (same format as for the assignment to a peripheral device).

Before sending the incoming request to the local monitor, the SIP constructs a description block of the temporary file. This block is confirmed if the result of the assignment by the local monitor is positive. Otherwise the block is cancelled.

The descriptor block of the temporary file set up is described on Table XXIV.

As soon as the assignment has been made, the result is broadcast to all (same format as for the assignment to a peripheral device).

If an assignment is made, the originating SIP also awaits M positive results before communicating the final result to the local monitor extension (EM). As in the previous case, a timer 58 of SIP is triggered at the moment of interrogation and reset when the request is satisfied. If the allotted time elapses before the request is satisfied, a negative result is returned to the user and a request cancellation is broadcast.

The attaching of a peripheral to a program will now be described. A peripheral device is attached to a program similarly to the assignment of a file code to a temporary file, i.e. the source process or the monitor specifies a number M of attached peripherals and self-selection takes place until the request is satisfied. On attaching, the peripheral(s) concerned is/are assigned a new global file code known only to the program to which it/they is/are linked. On detaching, the peripheral is reassigned the global file code of identical peripherals.

The execution of inputs/outputs use the following two mechanisms. Either all the identical resources allocated to the domain are concerned, or M resources are auto-selected from among N.

Updating multiple copies of files

Updating takes place simultaneously in order to preserve the coherence of the copies of the same file.

Service request to the monitor

Format LKM data M; basic write order (/05). The ECB associated with this request is described in Table XXV.

On receipt of this command, the monitor calls monitor extension (EM) responsible for forming the command block sent to the SIP. This block is described on Table XXVI.

As soon as this command block is ready, the SIP is activated (indirect start CIO). The interrogation block is then formed as shown on Table XXVII.

Figure 28:
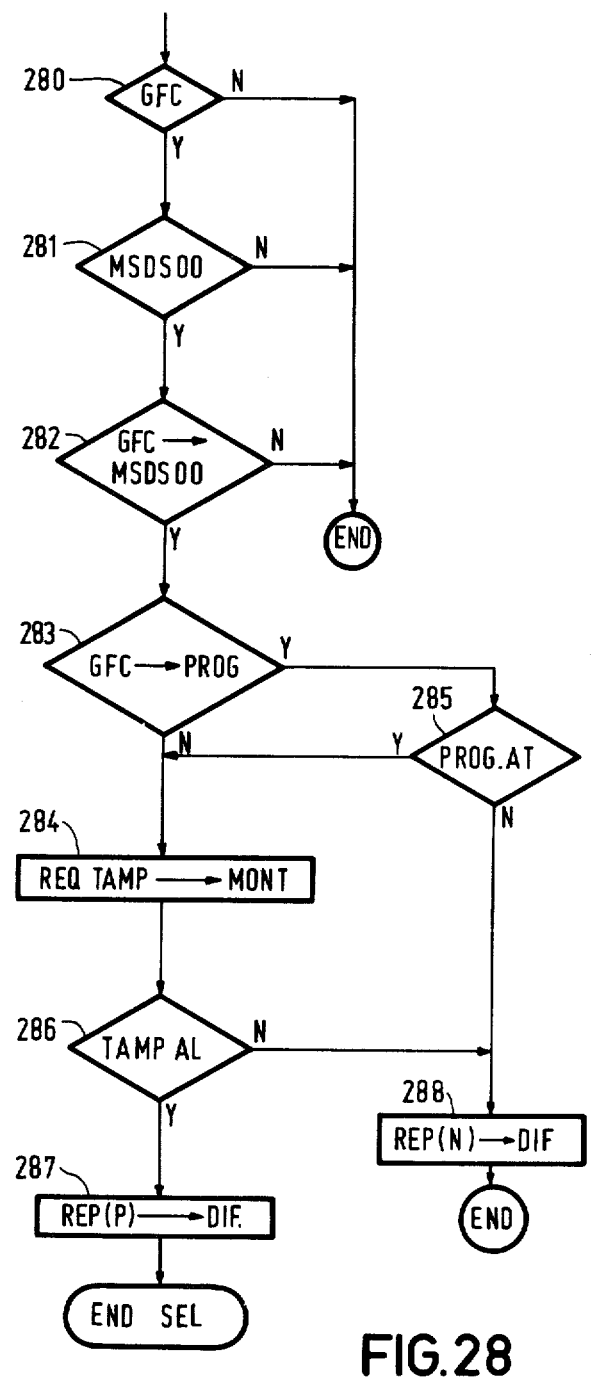
FIG. 28 is a flow-chart describing the updating of multiple copies of files.

This interrogation block is broadcast and every SIP executes the procedure shown in the flow-chart of FIG. 28.

TABLE XXV

| | |
|---|---|
| ECB Ad ⟶ | NN |
| | Buffer address |
| | Buffer length |
| | Reserved for the result |
| | Reserved for the result |
| | Not used |

TABLE XXVI

| CB Ad | (nature) 0 0 | (phase) 0 0 | |
|---|---|---|---|
| | | No. microtransaction L | |
| | Service requested | | Basic write |
| Specification of No. of copies | No. of copies M | NN | |
| | Buffer address | | |
| | Buffer length | | |

TABLE XXVII

| 0 0 | 0 0 |
|---|---|
| General micro-transaction No. | |
| No. of copies M | Basic write |
| Global file code No. | |
| Data block length | |
| M | S |
| D | S |
| 0 | 0 |
| Global program No. | |
| Program level | |

TABLE XXVIII

| (nature) 0 0 | (phase) 0 2 |
|---|---|
| Global micro-transaction No. | |
| Length of recording | |
| Data | |

Test 280 A test is made to determine the global file code contained in the interrogation is known locally (GFC). If not (N), the LS is not involved in this transmission and a switch is made to END; otherwise (Y), the next test 281 is performed.

Test 281 A test is made to determine whether the field MSDS 00 is known to the LS (MSDS 00). If not (N), the SL is not involved and a switch is made to END; otherwise (Y), test 282 is performed.

Test 282 A test is made to determine whether the file concerned is allocated to the MSDS 00 (GFC→MSDS 00). If not (N), the transaction is terminated. Otherwise (Y), test 283 is performed.

Test 283 A check is made to determine whether the file is attached to a given program (GFC→PROG). If not (N), block 284 is executed; otherwise (Y), test 285 is executed.

Block 284 A request for the allocation of a buffer in the dynamic zone is made to the monitor (REQ TAMP MONT). On receipt of a reply therefrom test 236 is executed.

Test 285 A check is made to determine whether the file is attached to the program originating the request (PROG AT). If yes (Y), sequence 284 is performed; if not (N), sequence 288 is carried out.

Test 286 On the reply from the monitor (block 284) a search is made to determine whether it was possible to obtain the allocation of the requested buffer (TAMP AL). If yes (Y), sequence 287 is executed; otherwise (N) sequence 288 is performed.

Block 287 A positive reply is broadcast (REP(P)-→DIF), the LS is selected, and the transaction switches to the next phase.

Block 288 A negative reply is broadcast (REP(N)-→DIF) and the transaction is terminated (END).

When the source LS has received a positive reply from the M LSs possessing copies of the file, it may transfer the data block from the main memory of its CPU to the LS concerned. The transfer takes place in the addressed mode if M = 1 and in the broadcast mode if M > 1.

The format of the data transfer block is described in Table XXVIII.

The SIPs with a copy of the file have stored the parameters relating to the service request and have obtained from the local monitor the allocation of a dynamic buffer zone with the length required. On receipt of the data, they are loaded with the allocated buffer, the address of which has been sent to the SIPs by the monitor extension (EM), until the length indicated in the execution block after decrementation after every loading of a word has reached zero. Then a basic write incoming request is sent to the monitor extension (EM) which transforms it and presents it to the local monitor for execution. Once it has been executed, the return of result process already described is executed.

The source SIP communicates the final result to its monitor extension (EM) only if it has received a result from all the LS responsible for updating a copy of the file.

To prevent blockages, once all the identical resources are involved in a request as in this example, the priority level criterion for the interacting process is ignored.

Reading a file

The self-selection mechanism is that used in the case of the assignment of a temporary file. An additional selection criterion is tested, the length of the buffer needed in the dynamic zone of the selected LS to ensure the transfer of the file to the source LS.

If M = 1, the most available unit is selected.

If M is greater than 1 (e.g. 3), the data received from the three producing units may be compared word for word. If there are differences, a majority decision is applied, i.e. the word is validated only if two out of the three are identical.

When the system is generated, the descriptor tables of the resources and processes are initialized. The resources are allocated to various application domains for the mutual protection of applications and to share the use of the resources by an even distribution of load over the global system.

The identical (common) resources have the same name. Identical means not only the same in structure but also in facility of access by a given application site, e.g. a TTY at the operator's site will not give him the same service as one located 1 km away.

The selection mechanisms may take the following form:

selection of all the resources satisfying a number of requirements but must satisfy M out of N (S1) (assignment of a file code to a peripheral);

selection of all the resources satisfying a certain number of requirements all of which (resources) are needed (S2) (updating multiple copies of a file);

auto-selection of M from N resources, needing M out of N (S3) (reading a file M may, of course, be 1).

When the preservation of the coherence of the data makes it necessary, an explicit or implicit attachment is made.

The addition, removal or migration of resources from one domain to another may be performed dynamically under the operators' control, by modifying the resource descriptor tables at SIP level.

APPENDIX

Physical interface SIP/P 800 LS (bus signals)

| Type of Wire | Number of Wires | Description | Mnemonic | Source | Dest. | Function |
|---|---|---|---|---|---|---|
| Control | 1 | Accepted | ACN | SIP | CPU | I/O dialogue |
| Control | 6 | Bus interrupted code lines | BIEC00 --- BIEC05 | SIP | CPU | Interrogations |
| Data | 16 | I/O bus lines | BI000N --- BI015N | All | All | Data channel |
| Control | 1 | Bus occupied | BUSYN | SIP | SIP | Bus control |
| Control | 1 | Character | CHA | SIP | Mem | Exchange in character mode |
| | | | | | CPU | |
| Control | 1 | Bus request | BUSRN | SIP | CPU | Bus request |
| Control | 1 | Acknowledge | CLEARN | CPU | SIP | General reset (MCL) |
| Address | 18 | Address lines | MAD00 --- MAD15 MAD64, MAD128 | SIP CPU | Mem SIP | Addressing |
| Control | 1 | Master selected | MSN | SIP CPU | SIP CPU | Priority control |
| Control | 1 | OK input | OKI | CPU | CPU | Selection of next master |
| Control | 1 | OK output | OKO | SIP CPU | SIP CPU | Selection of next master |
| Control | 1 | Power supply failure | PWF | SIP CPU | SIP SIP | Power supply control |
| Control | 1 | Supervise external interrupts | SCEIN | CPU | SIP | Interrupt sampling |
| Control | 1 | Supervise priority chain | SPYC | CPU | SIP | Priority control |
| Control | 1 | Master clock to peripheral (CU) | TMPN | CPU | SIP | Exchange synchronization signal |
| Control | 1 | Master clock to memory | TMRN | CPU | Mem | Exchange synchronization signal |
| Control | 1 | CU clock to master | TPMN | SIP SIP | CPU | Exchange synchronization signal |
| Control | 1 | Memory clock to master | TRMN | Mem | SIP CPU | Exchange synchronization signal |

SIP/CM Interface

| Type of wire | Number of wire | Description | Mnemonic | Source | Dest. | Function |
|---|---|---|---|---|---|---|
| Address | 16 | Address lines | ADRON --- ADRFN | SIP CM | SIP CM | Addressing |
| Control | 1 | Bus synchronization | BULKN | SIP | SIP CM | Synchronization |
| Control | 1 | Bus priority input | BPRNN | SIP or CM | SIP | Selection of next master |
| Control | 1 | Bus priority output | BPRON | SIP | SIP or CM | Selection of next master |
| Control | 1 | Bus request | BREQN | SIP | bus | Request for the bus control |
| Control | 1 | Bus occupied | CBUSYN | SIP CM | SIP CM | Bus control |
| Control | 1 | Module interrupt communication | CMITN | CM | SIP | Interrupt |
| Data | 16 | Data bus | DATON --- DATFN | SIP CM | SIP CM | Data bus |
| Control | 1 | Initialization | INITN | SIP | CM | Initialization |
| Control | 1 | I/O READ command | IORON | SIP | CM | Exchange synchronization signal |
| Control | 1 | I/O WRITE command | IOWON | SIP | CM | Exchange synchronization signal |
| Control | 1 | Memory READ command | MRDON | CM | SIP | Exchange synchronization signal |
| Control | 1 | Memory WRITE command | MWTON | CM | SIP | Exchange synchronization signal |

Physical CM/TM Interface

APPENDIX-continued

| Number of Wires | Description | Mnemonic | Source | Dest. | Function |
|---|---|---|---|---|---|
| 16 | Reception data (address, command, data) | AI0 --- AI15 | TM | CM | Command or data |
| 1 | Parity bit | P | TM | CM | Parity error control on reception |
| 1 | Error bit | E | TM | CM | Indicates an error on the network |
| 16 | Transmission data (address, command, data) | A∅0 --- A∅15 | CM | TM | Command or data |
| 1 | Procedure bit | K | CM | TM | Type of word (command or data) |
| 1 | Signal indicating the reception phase | RCM | TM | CM | Allows the LS to receive data |
| 1 | Reception clock | FCM | TM | CM | Storage of data in CM |
| 1 | Reception pulse | REFM | TM | CM | Prior preparation of data to be transmitted (synchronization) |
| 1 | Request to be transmitted | RTS | CM | TM | Request to transmit in a transmission frame |
| 1 | Transmission frequency | FREFM | TM | CM | Clock provided by TM for data transmission |

LIST OF REFERENCES (1) E. Douglas Jensen
"The Honeywell Experimental Distributed Processor An Overview".
Computer, January 1978, p 28-38.

(2) Heart F. E., Ornstein S. M., Crowther W. R. & Barker W. B.
"A New Minicomputer/Multiprocessor for the ARPA Network".
NCC (1973) p 529-537.

(3) Ornstein S. N., Crowther W. R., Kraley M. F., Bressler R. D. & Michel A.
"Pluribus - A Reliable Multiprocessor".
NCC (1975) p 551-559.

(4) Vidas B. Glydys & Judith A. Edwards
"Optimal Partitioning Of Wordload for Distributed Systems".
Digest of Papers, Compcon 76 Fall, September 1976, p 353-357.

(5) Thomas O. Wolff.
"Improvements in Real-time Distributed Control".
Digest of Papers, Compcon 77 Fall, September 1977, p 409a-409g.

(6) Le Cann G.
"A Protocol to Achieve Distributed Control in Failure Tolerant Multicomputer Systems.".
SIRIUS Research Report IRIA CRTI 002 1977.

(7) Farber D. J.
"A Distributed Computer System".
Report 4, Dept. Of Information And Computer Sciences, University of California, Irvine, U.S.A.

What is claimed is:

1. A distributed data processing system comprising a general communications network and a plurality of local systems, wherein the network is passive with respect to the self-contained operation of the respective local systems, and wherein each local system comprises at least one central processing unit, associated memory, at least one peripheral device and at least one residential process, local monitor means and a monitor extension module (42), wherein the control of the data processing in a local system is distributively effected by the local system itself, wherein each local system is interfaced to the network via its monitor extension module by means of a systems intercommunication processing means, the set of systems intercommunication processing means constituting a distributed coordination, communication, control, initialization and simulation means for the data processing system as a whole, each system intercommunication processing means being attached to the network via a communication module, the set of communication modules constituting a distributed control means for controlling communication protocols on the network for the data processing system as a whole, each communication module having sequencing means for controlling, in the communication protocols in a first sequence of steps, an addressed logical link from a source local system to a single destination local system and controlling in a second sequence of steps a broadcast logical link from a source local system to one or more destination local systems, said first and second sequences comprising conditionally executable logical link establishing steps, logical link maintaining steps and logical link terminating steps, said communication modules furthermore comprising information flow rate controlling means, presenting means for presenting the same general order of selected events at each local system, and error control means for detecting and thereupon recovering data communication errors, each communication module being plugged into the physical network by means of a transmission module, the set of transmission modules in combination with the physical network and a looping unit constituting a physical transport layer means, the physical network being a looped optical bus which is looped by said looping unit, wherein each transmission module comprises first control means for controlling parity errors, second control means for controlling synchronization between the transmission module itself and the transfer on the optical bus as presented, and bidirectional conversion means between electrical and optical signals, and wherein the looping unit has a first converting means for converting optical signals received from the bus to electrical signals, processing means for processing said electrical signals, and second converting means for converting processed electrical signals to optical signals for insertion into said optical bus, said processing means having encoding/decoding means for each transmission line of said bus, initializing means for initializing the transmission synchronization on the optical bus, and frame control means for controlling transmission and reception of data in a frame of a cycle of frames, the frame in question being allocated to one local system.

2. A system as claimed in claim 1, in which said transmission module (TM 15) also comprises:

(a) a circuit for calculating the parity (169) connected to a data transmission coder (170) which in turn is connected via a shift register (RDS 171), a delay component ($\tau$ 172) and an analog circuit (CA 173) to a laser diode (DL 174), said DL controlled by an element (POLDL 175), transmitting the data after electro-optical conversion to said optical bus (16), (b) an avalanche photodiode (PDA 176) established by a converter (ALHT 177) to perform the opto-electronic conversion of the data from said optical bus (16), said converted data being amplified in an amplification circuit (DAE 178) and then processed non-linearly in a circuit (TNL 181), the output of said TNL (181) being applied to a phase locking loop (PLL 182), the outputs of said PLL (182) being applied in turn to a decision circuit (183), a shift register (RDE 184) controlled by said decision circuit (183) performing the series-parallel transformation of said reception data, and said RDS (171), the output of said RDE (184) being linked to a decoder (185) and a comparator circuit (186), (c) a state sequencer (SEQ 187) managing the emission and reception frames in accordance with the information received from said PLL (182), decoder (185) and CM (13), (d) a command integrator COM TRIAC (179) connected to the output of said DAE (178) and controlling a triac (180), said triac (180) comprising means for powering said CM (13) and TM (15).

3. A system as claimed in claim 1, in which said looping unit (LIG 17) also comprises:

(a) a transmission shift register (RDE 191) connected to an application circuit (CA 195), the output of said CA (195) being connected to a laser diode (DL 196) controlled by a regulating element (REG 197), said DL (196) transmitting data in optical form to said optical bus (16), said RDE (191) being loaded either by a FIFO register (193) or by bits issued by a PROM (192), (b) an avalanche photodiode (PDA 199) controlled by a converter (ALHT 197 a) to receive the data from said optical bus (16), the output of said PDA (199) being regenerated by a regeneration circuit (DAE 199a), said circuit DAE (199a) being in turn connected to a decision circuit (198) making it possible to load said FIFO register (193) via a reception shift register (RDR 193a), (c) a master clock (H 190) emitting pulses at bit frequency to synchronize said RDE (191), RDR (193a) decision circuit (198) and a state sequencer (SEQ 194), said SEQ (194) ensuring said initialization and transmission synchronization procedures and controlling said RDE (191), PROM (192), FIFO register (193) and RDR (193a).

4. A system as claimed in claim 3 in which a description of the resources available at each local system (LS 10) is loaded into the RAM (54) of each of said intercommunication processor (SIP 11) when said global distributed system is generated, each of said descriptions of the resources available at each LS being dynamically updated in relation to the needs of the users and the evolution of said distributed system.

5. A system as claimed in claim 4, in which each of said descriptions of the resources available at each LS also comprises parameter translation and source code correspondence tables making it possible to translate between said LSs, a descriptive table of system resources and domains of application, a descriptive table of the communication mail-boxes, descriptive tables of the user resources, a table of free local codes, and chain start address tables of global and file code numbers.

6. A system as claimed in claim 5, in which the processing of each service request from a user process located in an LS is performed by means of a transaction also comprising discrete phases of interrogation, auto-selection, presentation, processing and return of the result, said service request sent being reformated by said monitor extension module (EM 42) and communicated to the originating SIP (11) across the LS/SIP interface by a block of commands and said LS/SIP intercommunication mechanisms.

7. A system as claimed in claim 6, in which said interrogation phase also comprises means for said originating SIP (11) to communicate an interrogation in the addressed mode to the LS (10) concerned when there is no possible choice and when the user process can localize the requested resource, means for said originating SIP (11) to communicate said interrogation in broadcast mode to all the LS when there is a possible choice of M among N resources, where N is greater than M, or when the user process cannot localize the resource, said service request being formatted as an interrogation block by said originating SIP and communication either in addressed or broadcast mode to the addressed LS or to all the LSs through said functional coordination (12) communication (14) and transport layers (18) using said intercommunication mechanism between said layers.

8. A system as claimed in claims 6 or 7, in which the auto-selection phase also comprises means, when there is a choice, of M among N resources, for selecting M LSs, means for each LS to analyze the replies sent to determine which M LSs are selected, means for the (N−M) LS not selected to cancel said service request, said auto-selection mechanism permitting all the LSs to have the same view of the global order of events.

9. A system as claimed in anyone of claims 6 or 7, in which said presentation phase also comprises means for presenting to the selected LS a service request in the form of a block of commands, said block of commands being communicated by the originating SIP to the selected LS through said coordination, communication and transport layers (18) using said interconnection mechanism between said layers, said EM located in each selected LS simulating said service request by generating the image of a local process.

10. A system as claimed in anyone of claims 6 or 7, in which said processing phase also comprises means allowing the local monitor of each selected LS to process said request in the same way as when it is issued by a local process, together with interruption means to inform said EM of the end of the processing of said request.

11. A system as claimed in anyone of claims 6 or 7, in which said result return phase also comprises means allowing the selected LS to communicate the result of the processing of said request to its SIP via the LS/SIP interface, means allowing said SIP to construct a result block as a function of the processing performed, said result block being communicated to the originating SIP via said coordination, communication and transport layers, said originating SIP, after the activation of said EM, transferring said result to the local user process via the SIP/LS interface.

* * * * *